US012589893B2

(12) United States Patent
Mukae

(10) Patent No.: US 12,589,893 B2
(45) Date of Patent: Mar. 31, 2026

(54) DEBRIS REMOVAL SATELLITE, DEBRIS REMOVAL CONTROL APPARATUS, DEBRIS REMOVAL CONTROL METHOD, AND GROUND FACILITY

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 11 days.

(21) Appl. No.: 18/953,145

(22) Filed: Nov. 20, 2024

(65) Prior Publication Data

US 2025/0074631 A1      Mar. 6, 2025

Related U.S. Application Data

(63) Continuation of application No. 17/622,875, filed as application No. PCT/JP2020/031690 on Aug. 21, 2020, now Pat. No. 12,179,943.

(30) Foreign Application Priority Data

Aug. 23, 2019      (JP) ................................. 2019-153090
Nov. 25, 2019      (JP) ................................. 2019-212513

(51) Int. Cl.
    *B64G 4/00*          (2006.01)
    *B64G 1/00*          (2006.01)
    (Continued)

(52) U.S. Cl.
    CPC .............. *B64G 4/00* (2013.01); *B64G 1/002* (2013.01); *B64G 1/1081* (2023.08);
    (Continued)

(58) Field of Classification Search
    CPC ........ B64G 4/00; B64G 1/002; B64G 1/1081; B64G 1/1085; B64G 1/2429; B64G 1/244;
    (Continued)

(56) References Cited

U.S. PATENT DOCUMENTS 4,750,692 A * 6/1988 Howard ................. B64G 1/648
                                                      244/172.6
5,082,211 A * 1/1992 Werka ...................... B64G 1/40
                                                      244/167
(Continued)

FOREIGN PATENT DOCUMENTS

DE        102017102481 A1      8/2018
EP            2860115 A1 *     4/2015 ........... B64G 1/6462
(Continued)

OTHER PUBLICATIONS

DiscriptionRU2695155C1English Translation.*
(Continued)

*Primary Examiner* — Assres H Woldemaryam
(74) *Attorney, Agent, or Firm* — XSENSUS LLP

(57)      ABSTRACT

A debris removal satellite includes a capture device, a thruster of a chemical propulsion method, and a propellant tank to store chemical fuel. A solar array wing is operable in an orbit at an orbital altitude higher than a congested orbit region congested with satellites forming a satellite constellation. The debris removal satellite is built in advance for future use as a satellite to be launched, and when a debris intrusion alarm to give a warning about intrusion of debris into the congested orbit region is issued, propellant is loaded into the propellant tank and the debris removal satellite is launched by a rocket built in advance for future use as a launch rocket. The debris removal satellite captures capture-target debris at an orbital altitude higher than the congested (Continued)

orbit region, and operates a propulsion device with the capture-target debris being captured.

11 Claims, 19 Drawing Sheets

(51) Int. Cl.

| | |
|---|---|
| *B64G 1/10* | (2006.01) |
| *B64G 1/24* | (2006.01) |
| *B64G 1/36* | (2006.01) |
| *B64G 1/40* | (2006.01) |
| *B64G 1/44* | (2006.01) |
| *B64G 1/62* | (2006.01) |
| *B64G 1/64* | (2006.01) |

(52) U.S. Cl.

CPC ......... *B64G 1/1085* (2013.01); *B64G 1/2429* (2023.08); *B64G 1/244* (2019.05); *B64G 1/361* (2013.01); *B64G 1/402* (2013.01); *B64G 1/443* (2013.01); *B64G 1/62* (2013.01); *B64G 1/6462* (2023.08); *B64G 1/2423* (2023.08); *B64G 1/40* (2013.01); *B64G 1/4026* (2023.08)

(58) Field of Classification Search

CPC ........ B64G 1/361; B64G 1/402; B64G 1/443; B64G 1/62; B64G 1/6462; B64G 1/2423; B64G 1/40; B64G 1/4026; B64G 3/00

See application file for complete search history.

(56) References Cited

U.S. PATENT DOCUMENTS

| | | | | |
|---|---|---|---|---|
| 5,163,641 | A | 11/1992 | Yasaka | |
| 6,186,446 | B1 | 2/2001 | Tilley et al. | |
| 9,714,101 | B1 * | 7/2017 | Kaplan ................... | B64G 1/26 |
| 10,640,239 | B2 * | 5/2020 | Reed ................... | B64G 1/1081 |
| 10,696,425 | B2 * | 6/2020 | Hickman ............... | B64G 1/648 |
| 2005/0103940 | A1 * | 5/2005 | Bischof ................. | B25J 18/025 |
| | | | | 244/172.4 |
| 2009/0101758 | A1 | 4/2009 | Leyre | |
| 2010/0038491 | A1 * | 2/2010 | Cepollina .............. | B64G 1/242 |
| | | | | 244/172.5 |
| 2010/0193640 | A1 * | 8/2010 | Atmur ................... | B64G 1/648 |
| | | | | 244/158.2 |
| 2011/0036952 | A1 * | 2/2011 | Moorer, Jr. .......... | B64G 1/2427 |
| | | | | 244/158.6 |
| 2012/0286100 | A1 | 11/2012 | Knirsch | |
| 2013/0175401 | A1 * | 7/2013 | Starke ................. | B64G 1/6462 |
| | | | | 244/171.1 |
| 2015/0097084 | A1 | 4/2015 | Szabo et al. | |
| 2015/0151856 | A1 * | 6/2015 | Reed .................... | B64G 1/1081 |
| | | | | 294/182 |
| 2017/0015444 | A1 | 1/2017 | Okada | |
| 2017/0113818 | A1 * | 4/2017 | Mori ........................ | B64G 1/64 |
| 2017/0210495 | A1 * | 7/2017 | Arwood ............... | B64G 1/6462 |
| 2017/0313447 | A1 * | 11/2017 | Reed ...................... | B64G 1/623 |
| 2018/0127115 | A1 | 5/2018 | Choi | |
| 2018/0251240 | A1 | 9/2018 | Reitman et al. | |
| 2019/0389602 | A1 | 12/2019 | Schilling | |
| 2022/0219841 | A1 * | 7/2022 | Mukae ................. | B64G 1/6462 |

FOREIGN PATENT DOCUMENTS

| | | | | |
|---|---|---|---|---|
| EP | 3015369 | A | 5/2016 | |
| EP | 3 156 335 | A1 | 4/2017 | |
| EP | 3 992 092 | A1 | 5/2022 | |
| FR | 2999537 | A1 * | 6/2014 | ............. B64G 1/648 |
| JP | 2001-18899 | A | 1/2001 | |
| JP | 2012-236591 | A | 12/2012 | |
| JP | 2015-199379 | A | 11/2015 | |
| JP | 6429109 | B2 | 11/2018 | |
| JP | 2019-131126 | A | 8/2019 | |
| RU | 2695155 | C1 * | 7/2019 | .............. B64G 1/00 |
| WO | 90/01447 | A1 | 2/1990 | |
| WO | WO-9405546 | A1 * | 3/1994 | ............. B64G 1/623 |

OTHER PUBLICATIONS

International Search Report and Written Opinion mailed on Nov. 2, 2020, received for PCT Application No. PCT/JP2020/031690, Filed on Aug. 21, 2020, 10 pages including English Translation.

Partial European Search Report dated Jan. 2, 2023 for the corresponding EP application No. 20857560.5, 15pp.

Office Action issued on Mar. 28, 2023, in corresponding Japanese patent Application No. 2022-134578, 8 pages.

Extended European Search Report issued Apr. 3, 2023 in European Application No. 20857560.5, 15 pages.

Office Action issued on Feb. 27, 2024, in corresponding Japanese patent Application No. 2023-142181, 9 pages.

Office Action issued on Nov. 5, 2024, in corresponding European patent Application No. 20857560.5, 5 pages.

Office Action dated Jun. 2, 2025 for corresponding U.S. Appl. No. 18/953,132 (22 pages).

\* cited by examiner

20: SATELLITE CONSTELLATION

70: EARTH

301: SATELLITE GROUP

Fig. 2

20: SATELLITE CONSTELLATION

70: EARTH

301: SATELLITE GROUP

20: SATELLITE CONSTELLATION

21: ORBITAL PLANE

POLAR REGION

301: SATELLITE GROUP

Fig. 5

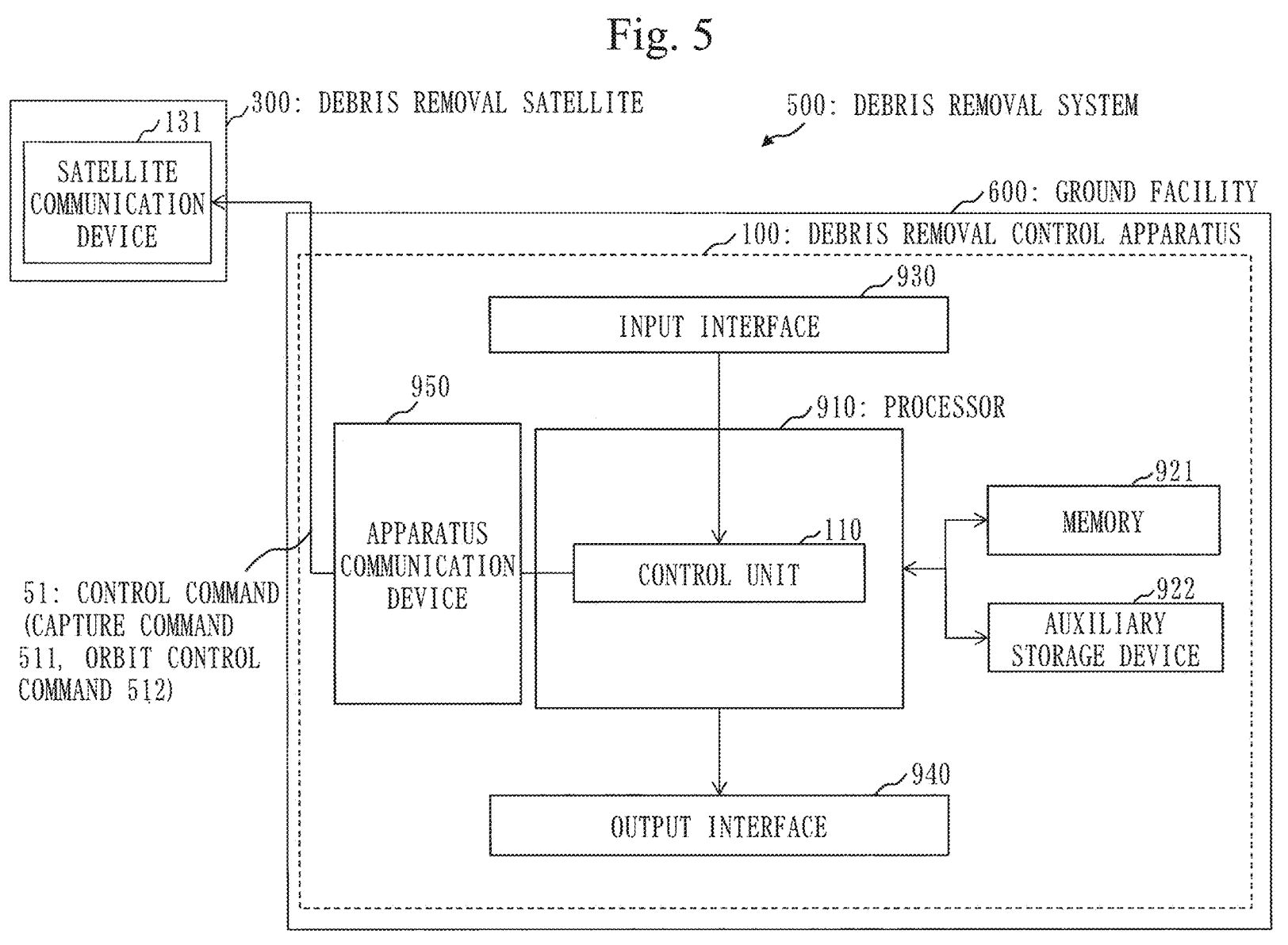

500: DEBRIS REMOVAL SYSTEM

300: DEBRIS REMOVAL SATELLITE

600: GROUND FACILITY

100: DEBRIS REMOVAL CONTROL APPARATUS

131
SATELLITE COMMUNICATION DEVICE

930
INPUT INTERFACE

910: PROCESSOR

110
CONTROL UNIT

921
MEMORY

922
AUXILIARY STORAGE DEVICE

940
OUTPUT INTERFACE

950
APPARATUS COMMUNICATION DEVICE

51: CONTROL COMMAND
(CAPTURE COMMAND 511, ORBIT CONTROL COMMAND 512)

START

S101 BUILD DEBRIS REMOVAL SATELLITE FOR FUTURE USE

S102 DEBRIS INTRUSION ALARM?

NO

YES

S103 LOAD PROPELLANT INTO PROPELLANT TANK

S104 LAUNCH DEBRIS REMOVAL SATELLITE

S105 CAPTURE CAPTURE-TARGET DEBRIS

S106 OPERATE PROPULSION DEVICE

END

Figure 14:
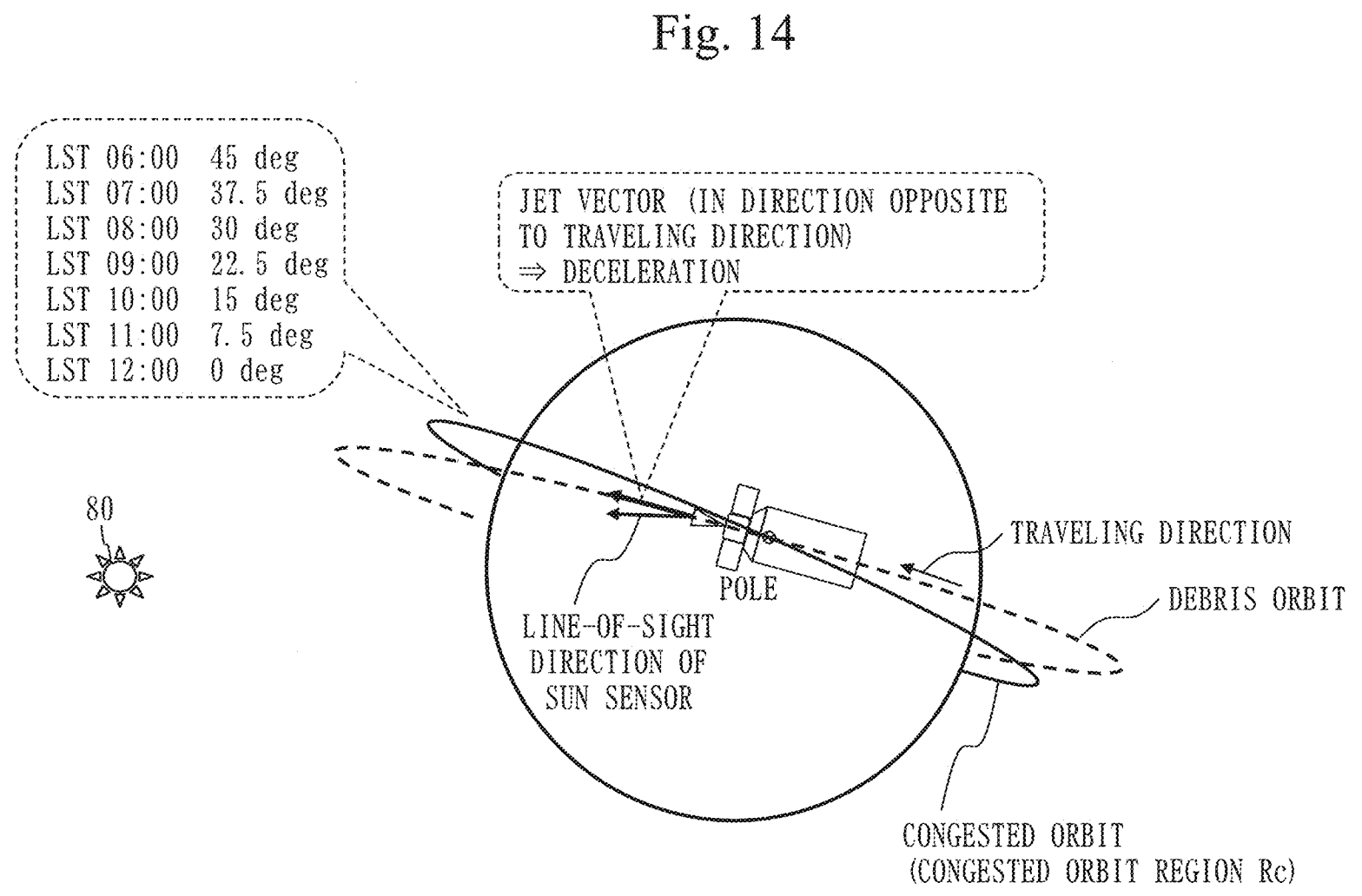

JET VECTOR (IN DIRECTION OPPOSITE TO TRAVELING DIRECTION)
→ DECELERATION

TRAVELING DIRECTION

DEBRIS ORBIT

CONGESTED ORBIT
(CONGESTED ORBIT REGION Rc)

POLE

LINE-OF-SIGHT DIRECTION OF SUN SENSOR

LST 06:00   45 deg
LST 07:00   37.5 deg
LST 08:00   30 deg
LST 09:00   22.5 deg
LST 10:00   15 deg
LST 11:00   7.5 deg
LST 12:00   0 deg

Figure 17:
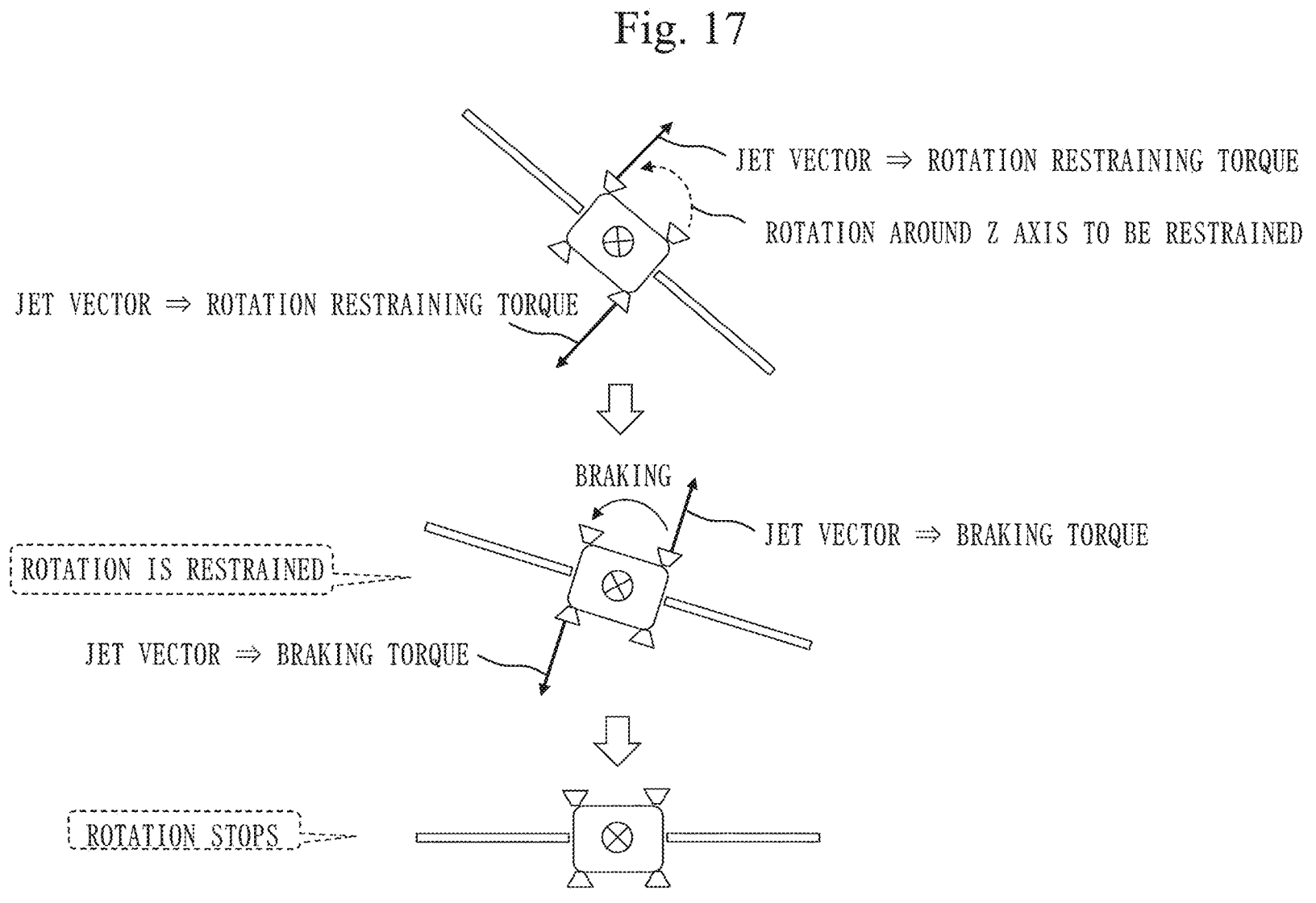

JET VECTOR ⇒ ROTATION RESTRAINING TORQUE

ROTATION AROUND Z AXIS TO BE RESTRAINED

JET VECTOR ⇒ ROTATION RESTRAINING TORQUE

JET VECTOR ⇒ BRAKING TORQUE

BRAKING

ROTATION IS RESTRAINED

JET VECTOR ⇒ BRAKING TORQUE

ROTATION STOPS

1

DEBRIS REMOVAL SATELLITE, DEBRIS REMOVAL CONTROL APPARATUS, DEBRIS REMOVAL CONTROL METHOD, AND GROUND FACILITY

CROSS-REFERENCE TO RELATED APPLICATIONS

The present application is a continuation of U.S. application Ser. No. 17/622,875, filed Dec. 27, 2021, which is based on PCT filing PCT/JP2020/031690, filed Aug. 21, 2020, which claims priority to Japanese Patent Application Nos. 2019-153090, filed Aug. 23, 2019, and 2019-212513, filed Nov. 25, 2019, the entire contents of each are incorporated herein by reference.

TECHNICAL FIELD

The present disclosure relates to a debris removal satellite to remove debris in outer space, a debris removal method, a debris removal control apparatus, a debris removal control method, and a ground facility.

BACKGROUND ART

In recent years, space debris such as an artificial satellite that has become uncontrollable due to a failure or rocket debris has been increasing, and retrieval of space debris has become a problem.

In addition to the increase in debris in outer space, large-scale satellite constellations including several hundreds to several thousands of satellites have started to be constructed, and the risk of collision accidents in orbit is increasing. Such a large-scale satellite constellation is called a mega-constellation.

In order to avoid collisions, there has been an appeal for the need for deorbit after completion of a mission in orbit (PMD), or ADR that causes debris such as a failed satellite or an upper stage of a rocket that is floating to deorbit by external means such as a debris removal satellite. International discussions have begun as STM on the need for such ADR. PMD is an abbreviation for Post Mission Disposal. ADR is an abbreviation for Active Debris Removal. STM is an abbreviation for Space Traffic Management.

As the number of space objects increases with the advent of mega-constellations and as debris increases, the risk of a collision between space objects is increasing. In particular, an orbit in the vicinity of Local Standard Time (LST) 10:30 of sun-synchronous orbit and at an orbital altitude of about 500 km to 800 km, which is often used by Earth observation optical satellites, is a congested orbit crowded with satellites of multiple countries and multiple operators. If debris intrudes into the congested orbit, the risk of a collision is high.

In a satellite constellation using polar orbits, satellites in all orbital planes pass through the polar regions. Therefore, the polar regions and high-latitude regions around the polar regions become congested regions. If debris intrudes into a congested orbit in these regions, the risk of a collision is high.

Satellites not having a collision avoidance function exist in these congested orbits and congested regions, so that if only some satellites take collision avoidance actions, there is also a risk of a collision with another nearby satellite.

Patent Literature 1 discloses a technology to capture space debris that is tumbling or rotating.

2

CITATION LIST

Patent Literature

Patent Literature 1: JP 2012-236591 A

SUMMARY OF INVENTION

Technical Problem

Patent Literature 1 discloses a towing artificial satellite that captures debris with a rope-like object and tows the captured debris. However, the risk of debris intruding into a congested orbit is not considered.

A primary object of the present disclosure is to provide a debris removal satellite that prevents debris from intruding into a congested orbit or a congested region.

Solution to Problem

A debris removal satellite according to the present disclosure removes debris in outer space, and the debris removal satellite includes a capture device to capture debris;

a propulsion device including a thruster of a chemical propulsion method and a propellant tank to store chemical fuel; and a solar array wing that is operable in an orbit at an orbital altitude higher than a congested orbit region, which is an orbit or a region congested with satellites forming a satellite constellation, wherein the debris removal satellite is built in advance for future use as a satellite to be launched, and when a debris intrusion alarm to give a warning about intrusion of debris into the congested orbit region is issued, propellant is loaded into the propellant tank, and the debris removal satellite is launched by a rocket built in advance for future use as a launch rocket, captures capture-target debris, which is target debris of the debris intrusion alarm, at an orbital altitude higher than the congested orbit region, and causes the propulsion device to operate with the capture-target debris being captured, so as to prevent the capture-target debris from intruding into the congested orbit region.

Advantageous Effects of Invention

In a debris removal satellite according to the present disclosure, when a debris intrusion alarm is issued, propellant is loaded into a propellant tank, and the debris removal satellite is launched by a rocket and captures capture-target debris, which is target debris of the debris intrusion alarm, at an orbital altitude higher than a congested orbit region. Then, the debris removal satellite operates a propulsion device with the capture-target debris being captured so as to prevent the capture-target debris from intruding into the congested orbit region. Therefore, the debris removal satellite according to the present disclosure has the effect of being able to prevent debris from intruding into a congested orbit region.

BRIEF DESCRIPTION OF DRAWINGS

FIG. 2 is an example in which a plurality of satellites in a single orbital plane realize an Earth observation service;

FIG. 5 is a configuration diagram of a debris removal system according to Embodiment 1;

FIG. 9 is an example of installation of a sun sensor according to Embodiment 1;

FIG. 13 is an example of a propulsion operation of the debris removal satellite after capturing debris according to a variation of Embodiment 1;

FIG. 14 is an example of a propulsion operation of the debris removal satellite after capturing debris according to a variation of Embodiment 1;

FIG. 16 is an example of a procedure for reversing with respect to a +Z direction, which is the traveling direction, in the debris removal satellite in a debris-captured state according to Embodiment 2;

FIG. 17 is an example of a procedure for restraining a rotation movement in the debris removal satellite in the debris-captured state according to Embodiment 2;

DESCRIPTION OF EMBODIMENTS

Figure 1:
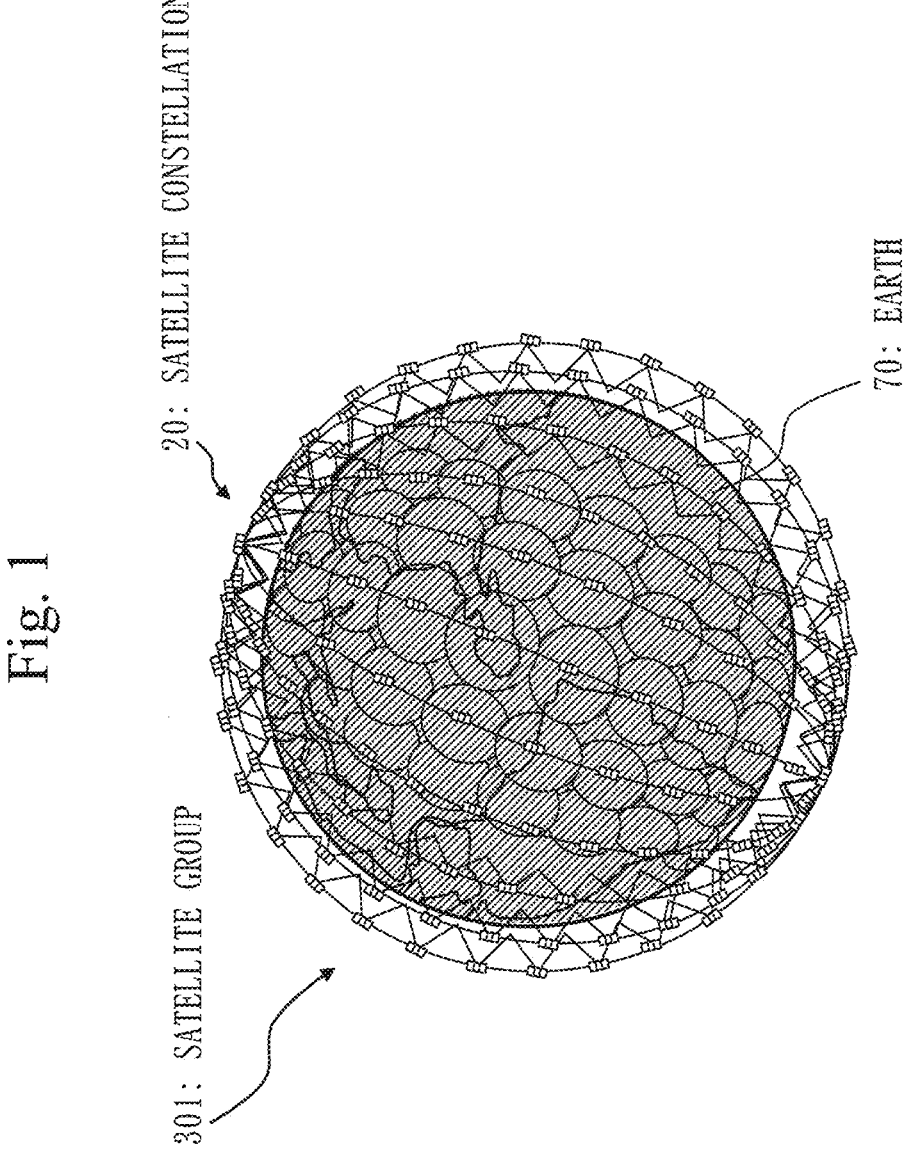
FIG. 1 is an example in which a plurality of satellites cooperatively realize a communication service to the ground over the entire globe of Earth.

Embodiments of the present disclosure will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

If a debris removal satellite passes through a congested low orbit or a congested region around a polar region in the process of deorbiting, the risk of a collision becomes disproportionately high. The congested low orbit is, for example, an orbit in the vicinity of local standard time (LST) 10:30 of sun-synchronous orbit and at an altitude of about 500 km to 800 km. The congested region around a polar region includes the polar regions and high-latitude regions around the polar regions.

In the following description, a congested region around a polar region including an orbit in the vicinity of LST 11:00 of sun-synchronous orbit and at an altitude of about 1000 km or including the polar regions will be called a congested orbit region Rc. The congested orbit region Rc is an orbit or region congested with a plurality of satellites forming a satellite constellation.

Specific examples of a satellite constellation will now be described.

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner. By providing adjacent orbital planes, a communication service can be provided to the ground with widespread coverage across the adjacent orbits. Similarly, by placing a large number of orbital planes at approximately equal intervals around Earth, a communication service to the ground can be provided over the entire globe.

Figure 2:
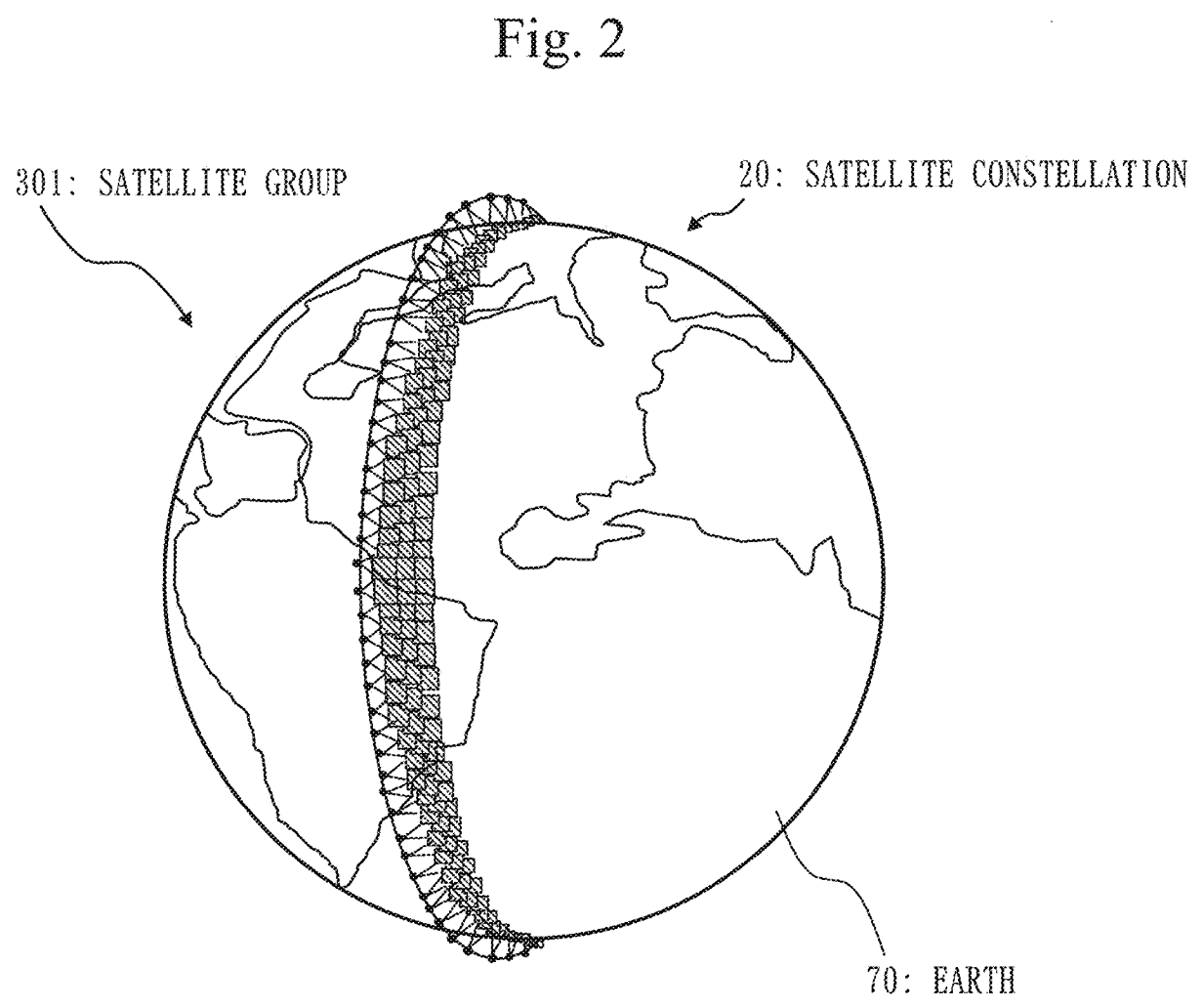

FIG. 2 is a diagram illustrating an example in which a plurality of satellites in a single orbital plane realize an Earth observation service.

FIG. 2 illustrates a satellite constellation 20 that realizes an Earth observation service. In the satellite constellation 20 of FIG. 2, satellites each equipped with an Earth observation device, which is an optical sensor or a radio sensor such as synthetic-aperture radar, fly at the same altitude in the same orbital plane. In this way, in a satellite group 301 in which the ground imaging ranges of successive satellites overlap in a time-delay manner, a plurality of satellites in orbit provide an Earth observation service by capturing ground images in turn in a time-division manner.

As described above, the satellite constellation 20 is formed with the satellite group 301 composed of a plurality of satellites in each orbital plane. In the satellite constellation 20, the satellite group 301 cooperatively provides a service. Specifically, the satellite constellation 20 refers to a satellite constellation formed with one satellite group by a communications service company as illustrated in FIG. 1 or an observation service company as illustrated in FIG. 2.

Figure 3:
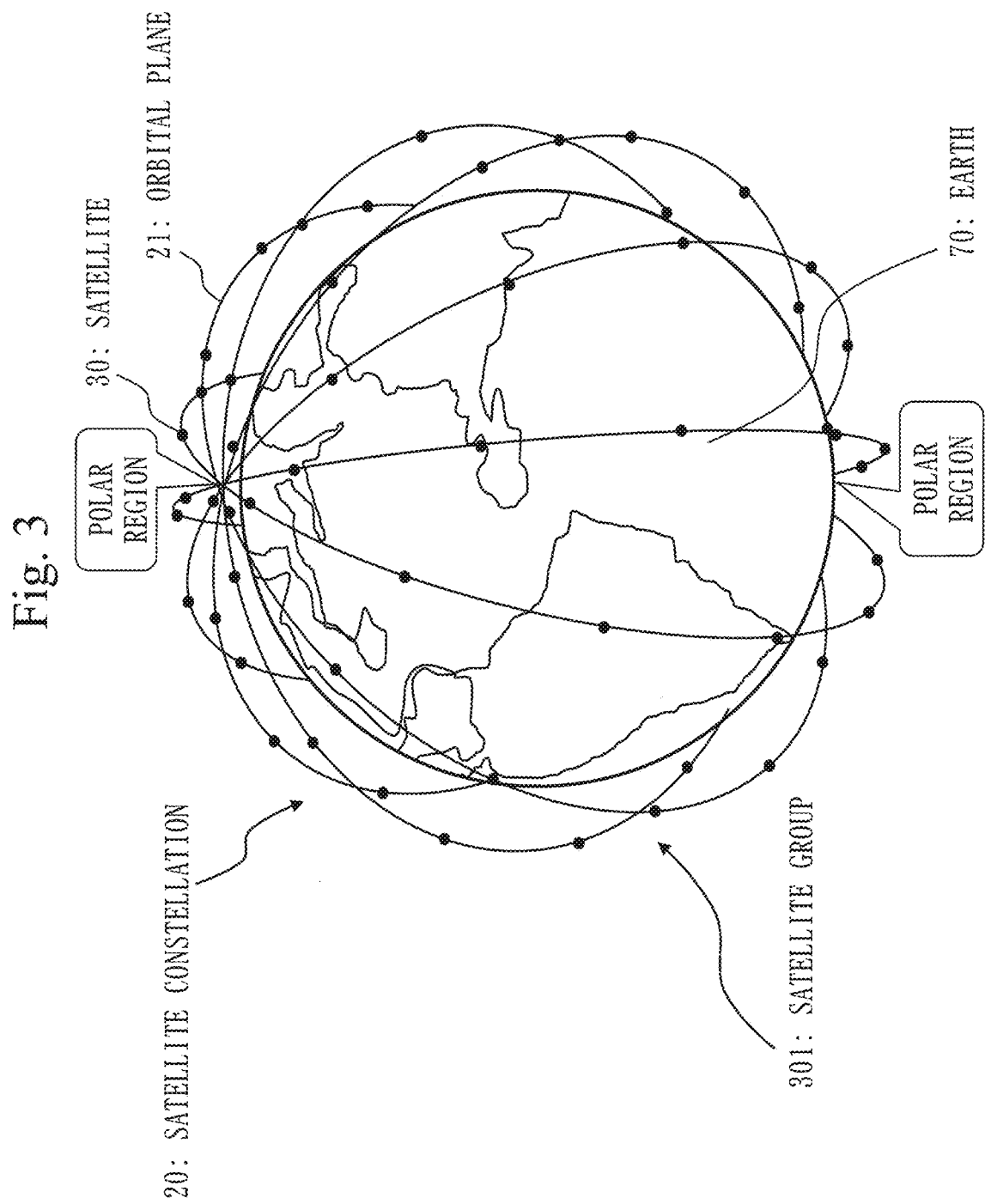
FIG. 3 is an example of a satellite constellation having a plurality of orbital planes that intersect in the vicinity of the polar regions.
Figure 4:
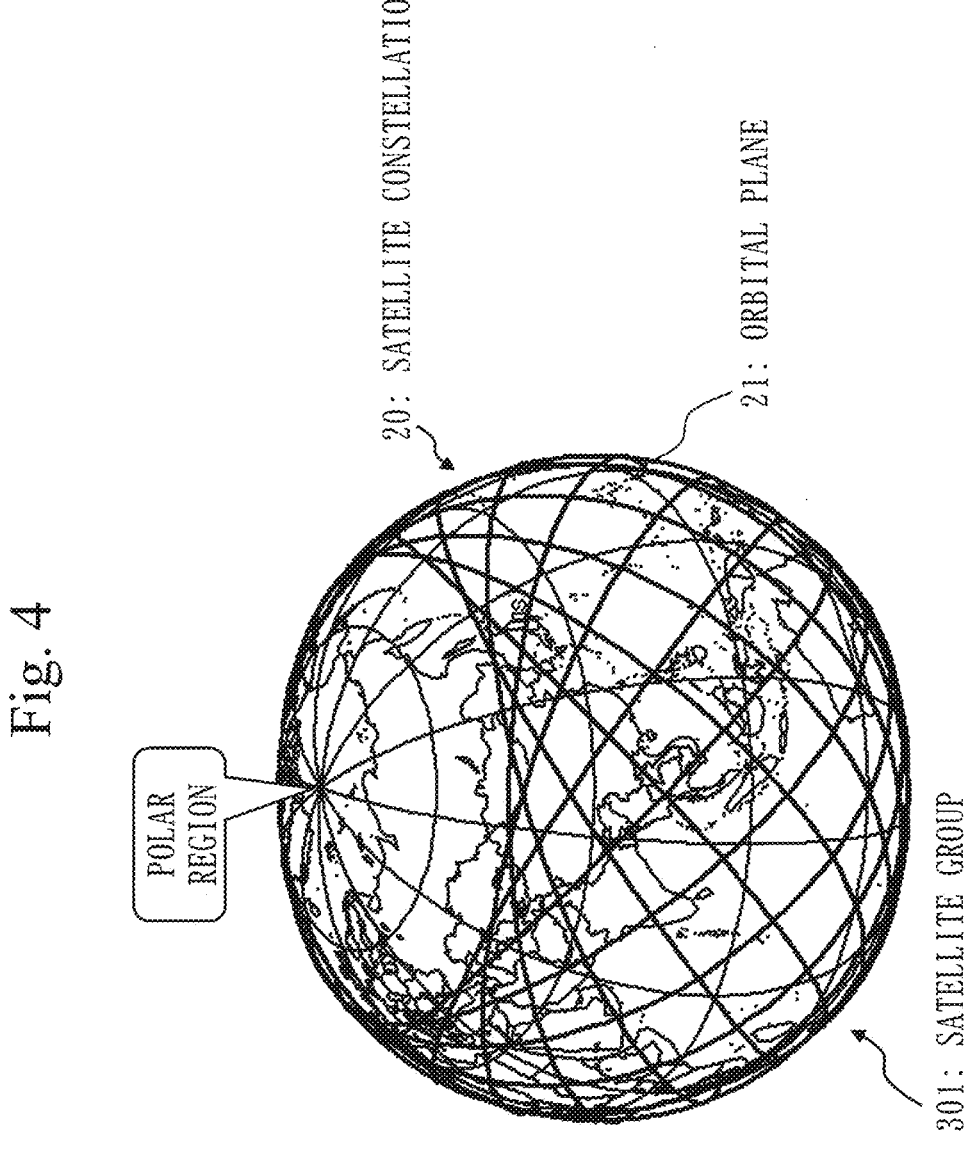
FIG. 4 is an example of a constellation having a plurality of orbital planes that intersect outside the polar regions.

FIG. 3 is an example of a satellite constellation 20 having a plurality of orbital planes 21 that intersect in the vicinity of the polar regions. FIG. 4 is an example of a satellite constellation 20 having a plurality of orbital planes 21 that intersect outside the polar regions.

In the satellite constellation 20 of FIG. 3, the orbital inclination of each of the plurality of orbital planes 21 is about 90 degrees, and the orbital planes 21 exist on mutually different planes.

In the satellite constellation 20 of FIG. 4, the orbital inclination of each of the plurality of orbital planes 21 is not about 90 degrees, and the orbital planes 21 exist on mutually different planes.

In the satellite constellation 20 of FIG. 3, any given two orbital planes intersect at points in the vicinity of the polar regions. In the satellite constellation 20 of FIG. 4, any given two orbital planes intersect at points outside the polar regions. In FIG. 3, a collision between satellites 30 may occur in the vicinity of the polar regions. As illustrated in FIG. 4, the intersection points between the orbital planes each with an orbital inclination greater than 90 degrees move away from the polar regions according to the orbital inclination. Depending on the combinations of orbital planes, orbital planes may intersect at various locations including the vicinity of the equator. For this reason, places where collisions between satellites 30 may occur are diversified. In the following description, a satellite 30 may be called an artificial satellite.

For deorbit in a region where the risk of a collision is disproportionately high such as the congested orbit region Rc, the rules for deorbit actions such as PMD or ADR currently being discussed are insufficient. In the deorbit process before entry into the atmosphere, it is necessary to carry out an active control operation during orbital descent which causes a descent by avoiding a region with disproportionately high risks. Such an active control operation during orbital descent will be called an active deorbit operation. It is possible to avoid a collision by operation control in the deorbit process so as to control the orbital plane, altitude, timing for changing the orbital plane or altitude, and so on.

It is also necessary to control debris to prevent the debris from intruding into the congested orbit region Rc. In this embodiment, a debris removal satellite that removes debris before the debris intrudes into the congested orbit region Rc will be described.

It would be too late to prepare a debris removal satellite after a debris intrusion alarm to warn that debris will intrude into the congested orbit region Rc is issued. Therefore, it is rational to build a completed debris removal satellite in advance for future use and immediately launch the debris removal satellite in an emergency. Normally, satellite design differs in power paddle system design or heat design, depending on orbital launch conditions. Therefore, it is difficult to build a completed satellite for future use.

In light of the fact that the congested orbit region Rc where the risk of a collision is high is concentrated in a specific area in sun-synchronous orbit and the polar regions, this embodiment makes it possible to deal with both by debris removal satellites of the same design.

Description of Configurations

FIG. 5 is a diagram illustrating a configuration of a debris removal system 500 according to this embodiment.

Figure 6:
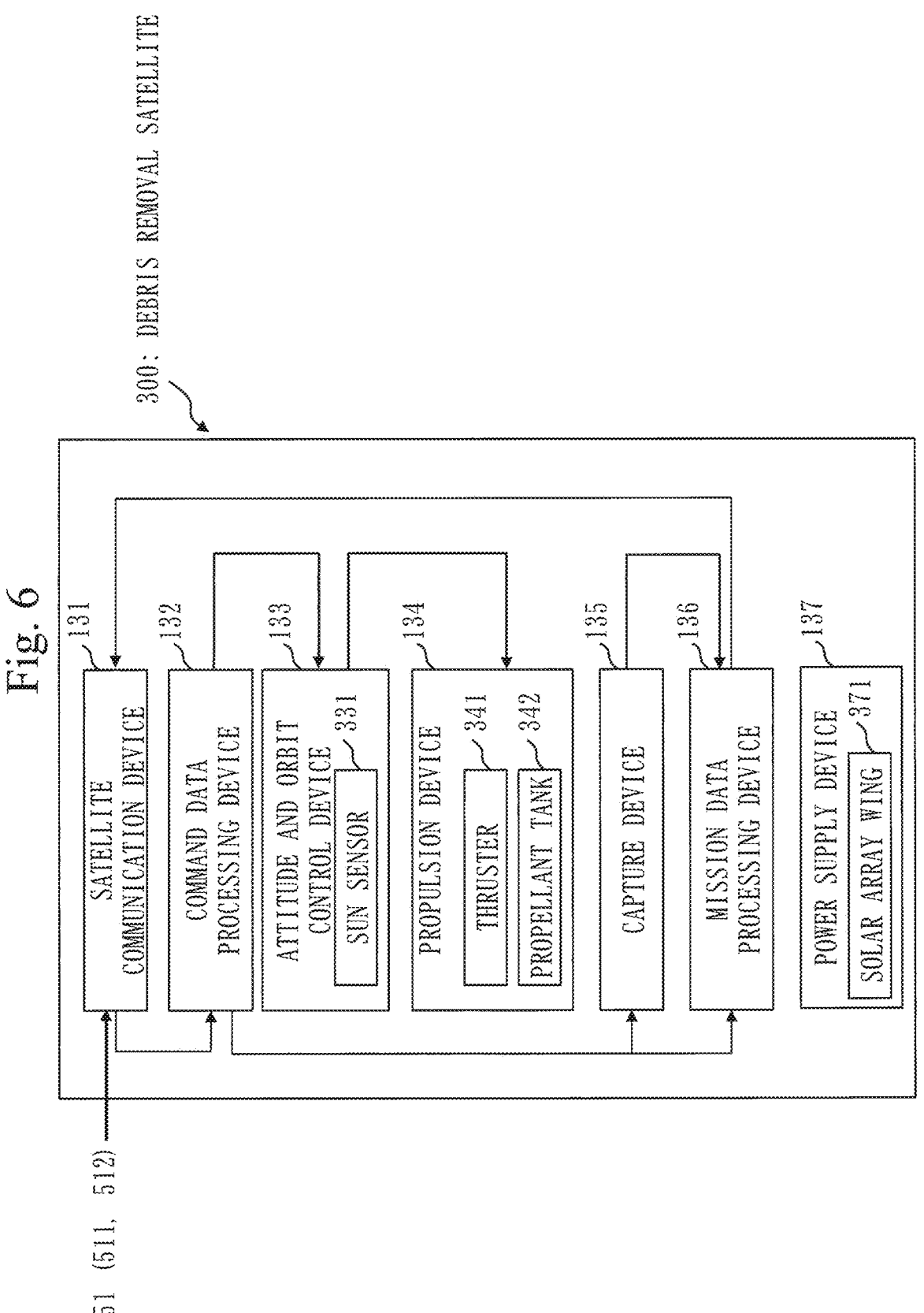
FIG. 6 is a configuration diagram of a debris removal satellite according to Embodiment 1.

FIG. 6 is a diagram illustrating a configuration of a debris removal satellite 300 according to this embodiment.

The debris removal system 500 includes a debris removal control apparatus 100, which is a ground facility 600, and the debris removal satellite 300.

Specifically, debris 200 is an object such as an artificial satellite that has become uncontrollable due to a failure, an artificial satellite that has completed a mission, or rocket debris. In the following description, the debris to be captured by the debris removal satellite 300 will be referred to as capture-target debris 201.

The debris removal satellite 300 is a satellite that removes the debris 200 in outer space. The debris removal satellite 300 communicates with the debris removal control apparatus 100. The debris removal satellite 300 and the debris removal control apparatus 100 communicate with each other via an apparatus communication device 950 of the debris removal control apparatus 100 and a satellite communication device 131 of the debris removal satellite 300.

The debris removal control apparatus 100 is a facility installed on the ground and controls the operation of the debris removal satellite 300. For example, the debris removal control apparatus 100 may be composed of a ground station, such as a ground antenna device, a communication device connected to a ground antenna device, or an electronic computer, and a ground facility as a server or terminal connected with the ground station via a network. The debris removal control apparatus 100 may include a communication device installed in a mobile object such as an airplane, a self-driving vehicle, or a mobile terminal. The debris removal control apparatus 100 is an apparatus that controls the debris removal satellite 300 to retrieve and remove debris such as rocket debris or a failed satellite. The debris removal control apparatus 100 is also referred to as a ground apparatus or the ground facility 600.

The debris removal control apparatus 100 includes a computer. The debris removal control apparatus 100 includes a processor 910, and also includes other hardware components such as a memory 921, an auxiliary storage device 922, an input interface 930, an output interface 940, and the apparatus communication device 950. The processor 910 is connected with other hardware components via signal lines and controls these other hardware components.

The debris removal control apparatus 100 includes a control unit 110 as a functional element. The functions of the control unit 110 are realized by hardware or software.

The processor 910 is a device that executes a debris removal program. The debris removal program is a program that realizes the functions of the control unit 110.

The processor 910 is an integrated circuit (IC) that performs operational processing. Specific examples of the processor 910 are a central processing unit (CPU), a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of an output device, such as a display, is to be connected. Specifically, the output interface 940 is a USB terminal or a High Definition Multimedia Interface (HDMI, registered trademark) terminal. Specifically, the display is a liquid crystal display (LCD).

The apparatus communication device 950 has a receiver and a transmitter. Specifically, the apparatus communication device 950 is a communication chip or a network interface card (NIC). The debris removal control apparatus 100 communicates with the debris removal satellite 300 or other devices via the apparatus communication device 950.

The debris removal program is read into the processor 910 and executed by the processor 910. The memory 921 stores not only the debris removal program but also an operating system (OS). The processor 910 executes the debris removal program while executing the OS. The debris removal program and the OS may be stored in the auxiliary storage device 922. The debris removal program and the OS that are stored in the auxiliary storage device 922 are loaded into the memory 921 and executed by the processor 910. Part or the entirety of the debris removal program may be embedded in the OS.

The debris removal control apparatus 100 may include a plurality of processors as an alternative to the processor 910. These processors share the execution of the debris removal program. Each of the processors is, like the processor 910, a device that executes the debris removal program.

Data, information, signal values, and variable values that are used, processed, or output by the debris removal program are stored in the memory 921 or the auxiliary storage device 922, or stored in a register or a cache memory in the processor 910.

"Unit" of the control unit 110 may be interpreted as "process", "procedure", or "step". "Process" of the control process may be interpreted as "program", "program product", or "computer readable storage medium recording a program".

The debris removal program causes a computer to execute each process, each procedure, or each step, where "unit" of the above control unit 110 is interpreted as "process", "procedure", or "step". A debris removal method includes a method performed by execution of the debris removal program by the debris removal control apparatus 100.

The debris removal program may be stored and provided in a computer readable recording medium or storage medium. Alternatively, the debris removal program may be provided as a program product.

Referring to FIG. 6, a configuration of the debris removal satellite 300 according to this embodiment will be described.

The debris removal satellite 300 is an artificial satellite. The debris removal satellite 300 is a satellite produced for the purpose of debris removal. Alternatively, the debris removal satellite 300 may be a satellite that also serves as an observation satellite or a communication satellite. The debris removal satellite 300 includes devices such as the satellite communication device 131, a command data processing device 132, an attitude and orbit control device 133, a propulsion device 134, a capture device 135, a mission data processing device 136, and a power supply device 137. The capture device 135 may be regarded as a capturer to capture debris, for instance, by retaining six degrees of freedom of the debris. Further, one or more portions of the debris removal satellite 300, such as the satellite communication device 131, the command data processing device 132, the attitude and orbit control device 133, the mission data processing device 136, and/or the power supply device 137, or portions thereof, can be regarded as processing circuitry.

The capture device 135 is a device that captures the capture-target debris 201. For example, the capture device

135 captures the capture-target debris 201 by restraining six degrees of freedom of the capture-target debris 201. The capture device 135 may transmit capture data indicating a capture status of the capture-target debris 201 to another debris removal satellite 300 or the debris removal control apparatus 100.

The propulsion device 134 is a device to change the velocity of the debris removal satellite 300. Specifically, the propulsion device 134 includes a thruster 341 of a chemical propulsion method and a propellant tank 342 to store chemical fuel. The propulsion device 134 may further include a thruster 341 of an electric propulsion method and a propellant tank 342 to store fuel of the electric propulsion method. For example, the propulsion device 134 is a hydrazine thruster, an ion engine, or a Hall thruster.

The propellant tank 342 has a tank capacity to store the amount of propellant for making the capture-target debris 201 descend to the atmosphere. The propellant tank 342 has the tank capacity to store the amount of propellant for making the capture-target debris 201 descend to the atmosphere, in addition to propellant necessary for the operation the debris removal satellite 300 itself.

The satellite communication device 131 is a device to receive a command and transmit capture data. The command is a signal transmitted from the ground and is transferred, as data or a control signal, to the attitude and orbit control device 133 or the capture device 135 via the command data processing device 132. The capture data is data that indicates a capture operation performed by the capture device 135 and is transmitted, using the satellite communication device 131, to the ground or a data relay satellite via the mission data processing device 136. For example, the capture data indicates a capture state of the capture-target debris 201.

The attitude and orbit control device 133 is a device to control attitude elements such as the attitude and angular velocity of the debris removal satellite 300 and the orientation of the capture device 135 and to control orbital elements of the debris removal satellite 300. The attitude and orbit control device 133 changes the orientation of each attitude element to a desired orientation. Alternatively, the attitude and orbit control device 133 maintains each attitude element in a desired orientation. The attitude and orbit control device 133 includes an attitude sensor, an actuator, and a controller.

The attitude sensor is used for attitude control. Specifically, the attitude sensor is a sensor such as a gyroscope, an Earth sensor, a sun sensor, a star tracker, or a magnetic sensor. In this embodiment, it is assumed that a sun sensor 331 is provided. Instead of the sun sensor 331, a star sensor 332 may be employed. Alternatively, both the sun sensor 331 and the star sensor 332 may be provided.

The actuator is an instrument such as a momentum wheel, a reaction wheel, or a control moment gyroscope.

The controller controls the actuator by executing a control program based on measurement data of the attitude sensor or a control command from Earth.

The attitude and orbit control device 133 includes a Global Positioning System receiver (GPSR) and a controller. Specifically, the actuator is an attitude and orbit control thruster. The controller executes a control program based on measurement data of the attitude sensor and the GPSR or a control command from Earth, and performs orbit control by controlling the attitude and the propulsion device 134.

Specifically, the power supply device 137 includes equipment such as a solar cell, a battery, and an electric power control device. The power supply device 137 provides electric power to each piece of equipment installed in the debris removal satellite 300. The power supply device 137 includes a solar array wing 371 as the solar cell. The solar array wing 371 is operable in an orbit at a higher orbital altitude than the congested orbit region Rc. Specifically, the solar array wing 371 is a solar array wing that allows long-time operation in an orbit in the vicinity of LST 11:00 of sun-synchronous orbit and at an altitude of about 1000 km.

A processing circuit of the controller included in the attitude and orbit control device 133 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit.

FPGA is an abbreviation for Field Programmable Gate Array.

The control unit 110 generates a control command 51 to be transmitted to the debris removal satellite 300. The control command 51 includes, for example, a capture command 511 and an orbit control command 512.

\*\*\*Description of Operation\*\*\*

Figure 7:
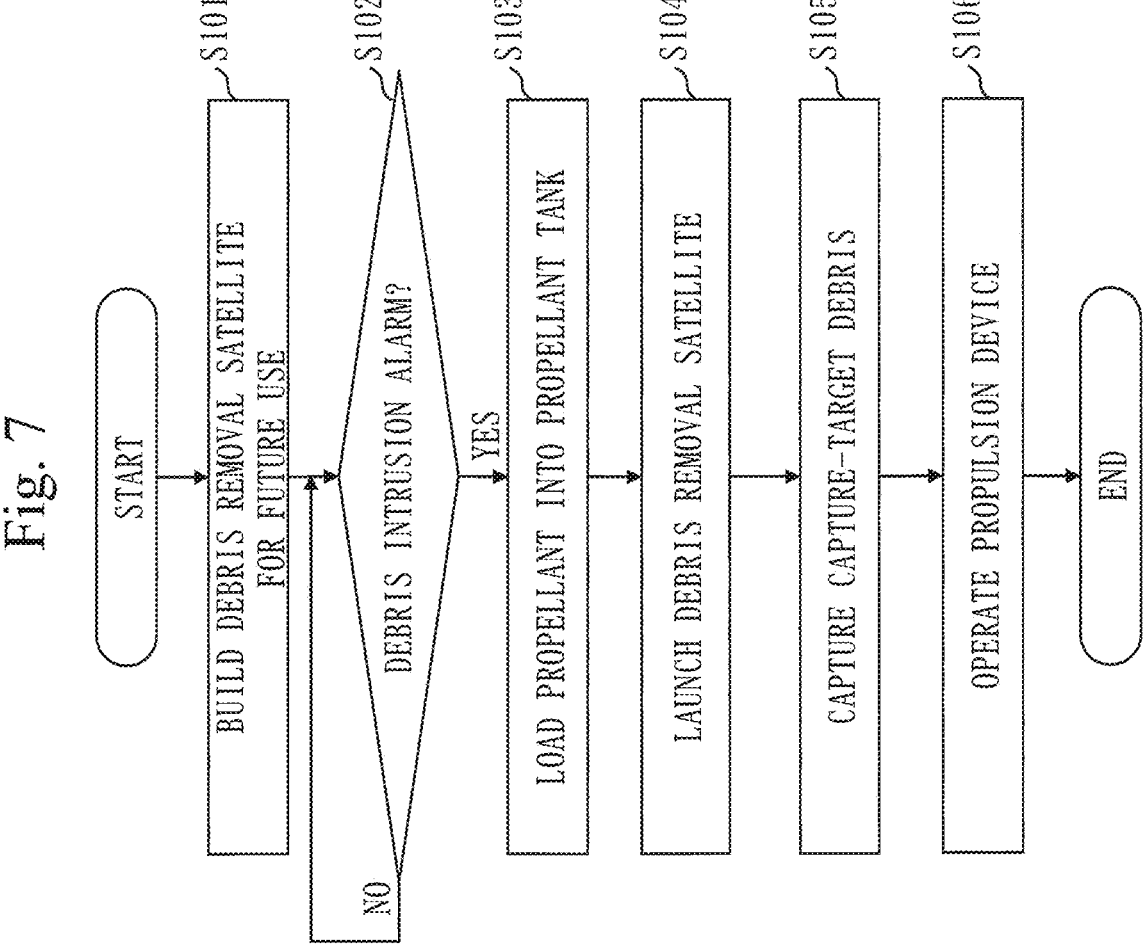
FIG. 7 is a flowchart of a debris removal method using the debris removal satellite according to Embodiment 1.

Referring to FIG. 7, a debris removal method using the debris removal satellite 300 according to this embodiment will be described.

In step S101, the debris removal satellite 300 is built in advance for future use as a satellite to be launched. The configuration of the debris removal satellite 300 is as described with reference to FIG. 6.

In step S102, it is determined whether a debris intrusion alarm has been issued. If a debris intrusion alarm has been issued, step S103 is taken.

A debris intrusion alarm regarding intrusion into the congested orbit region Rc is issued based on, for example, prediction value public information on satellite orbits and debris information that is held by an SSA operator. The prediction value public information on satellite orbits is information provided by operators of satellites flying in congested orbits. SSA is an abbreviation for Space Situation Awareness. The SSA operator or an orbit analysis service operator performs orbit analysis based on the prediction value public information on satellite orbits and debris information, and issues a debris intrusion alarm if it is predicted that debris will intrude into a congested orbit.

In step S103, propellant is loaded into the propellant tank 342.

In step S104, the debris removal satellite 300 is launched by a rocket built in advance for future use as a launch rocket.

In step S105, the debris removal satellite 300 captures the capture-target debris 201, which the target debris of the debris intrusion alarm, at an orbital altitude higher than the congested orbit region Rc. Specifically, the debris removal satellite 300 captures the capture-target debris 201 by restraining six degrees of freedom of the capture-target debris 201.

If the debris to be captured is small, a method of gripping the debris with a robot arm is effective as a debris capture method. If the debris to be captured is large, a method of sandwiching the debris with a parent satellite and a child satellite is effective.

An example of a method for attitude adjustment in orbit involved in capturing debris by the debris removal satellite 300 will be described. In order for the capture device 135 for debris to properly capture the debris, a method of gripping the debris with a robot arm is effective, for example. However, parts of the debris that are suitable for being gripped are often limited. The debris removal satellite 300 brings the capture device 135 closer to a part of the debris suitable for being gripped through approach and attitude control, called a rendezvous, in orbit, and captures the debris in the same way as in finally docking with the debris. At this time, the debris removal satellite 300 fixes the debris by restraining six degrees of freedom. Specifically, it is appropriate to use a camera provided in the debris removal satellite 300 to image the motion state of the debris and the part of the debris to be gripped and achieve capture while visually checking.

After the debris is captured, one or more jet ports of one or more thrusters may be blocked and cannot be used in the debris removal satellite 300, so that the debris removal satellite 300 in a debris-captured state may need to reverse the traveling direction.

In step S106, the debris removal satellite 300 operates the propulsion device 134 with the capture-target debris 201 being captured so as to prevent the capture-target debris 201 from intruding into the congested orbit region Rc. To prevent the capture-target debris 201 from intruding into the congested orbit region Rc means to prevent the capture-target debris 201 from intruding into the congested orbit region Rc due to free fall.

Then, the debris removal satellite 300 in the debris-captured state makes the capture-target debris 201 descend to the atmosphere while avoiding collisions.

As a method for preventing intrusion into a congested orbit, an active deorbit operation is carried out, for example. An effective method is to operate, by the active deorbit operation, the propulsion device to change the orbital altitude and delay the time to intrude into the congested orbit, so as to wait for the congested orbital plane to rotate around the axis of Earth and pass away from the passage route.

When a debris intrusion alarm regarding intrusion into the polar and high-latitude region is received, an effective method is to gradually change the orbital inclination to move in a direction of lower latitudes.

As described above, the debris removal satellite 300 in the debris-captured state has the effect of being able to prevent the debris from intruding into the congested orbit region Rc and protecting the space environment.

Figure 8:
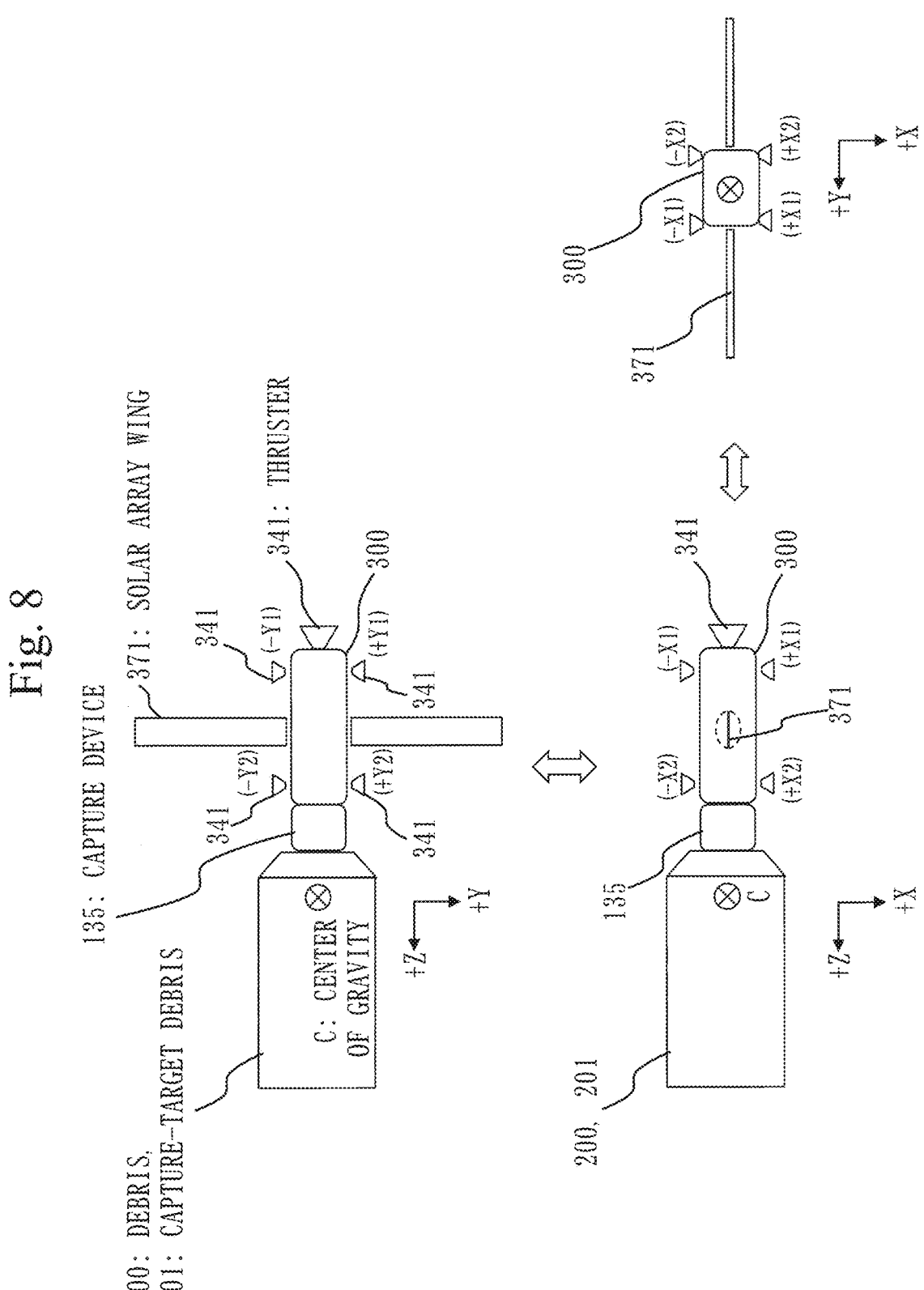
FIG. 8 is a schematic diagram of three sides of the debris removal satellite according to Embodiment 1 that has captured capture-target debris.
Figure 9:
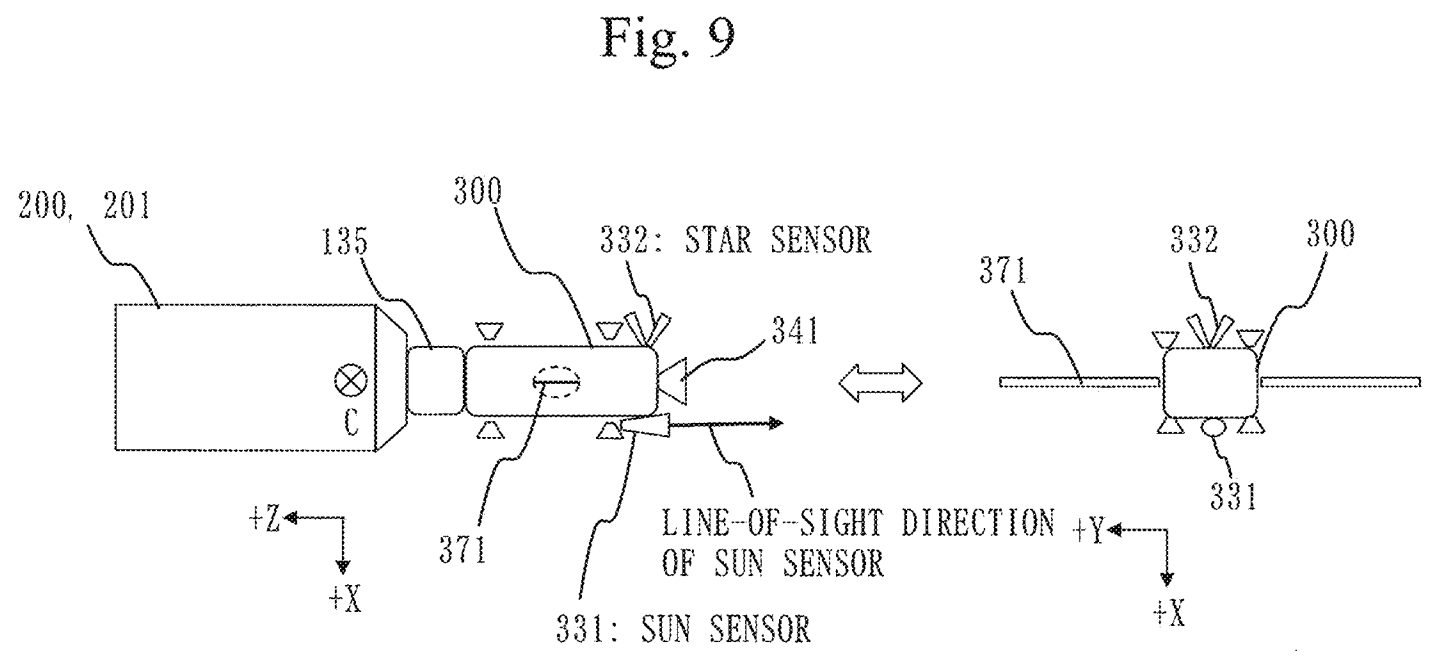

Referring to FIGS. 8 and 9, an example of an arrangement of the debris removal satellite 300 according to this embodiment will now be described.

FIG. 8 is a schematic diagram of three sides of the debris removal satellite 300 according to this embodiment that has captured the capture-target debris 201.

In FIG. 8, when it is assumed that a-Z direction at the time of rocket launch is a rocket interface side in the debris removal satellite 300, the debris removal satellite 300 is provided with the capture device 135 in the axial direction of a launcher, that is in a +Z direction. The debris removal satellite 300 is also provided with the thrusters 341 as a propulsion system that emits jets in ±X, ±Y, and ±Z directions. However, the jet direction of the propulsion system that emits a jet in the +Z direction may be blocked by the capture-target debris 201 after the debris has been captured.

As the propulsion device 134, it is rational to adopt the chemical propulsion method with high immediate efficiency in an emergency after a debris intrusion alarm is issued. Therefore, when the chemical propulsion method is used in the debris removal satellite 300 for both the operation of the satellite itself and the operation after capturing the debris, the propellant tank 342 has a tank capacity to store propellant for making the capture-target debris 201 descend to the atmosphere, in addition to propellant necessary for the operation of the satellite itself.

For the operation from launch of the debris removal satellite 300 until the capture-target debris 201 is captured and for the operation at normal times when a debris intrusion alarm has not been issued, the propulsion device 134 of the electric propulsion method may be adopted. However, in an emergency after a debris intrusion alarm or collision alarm is issued, the debris removal satellite 300 needs the ability to change the orbit or attitude quickly with a large thrust by the chemical propulsion method.

Therefore, when electric propulsion for normal times and chemical propulsion for an emergency are both to be employed, a propellant tank for the electric propulsion method and a propellant tank for the chemical propulsion method are to be provided as the propellant tanks 342. That is, the propellant tank for electric propulsion necessary for the operation of the satellite itself and also the propellant tank to store chemical propellant for making the capture-target debris 201 descend to the atmosphere are to be provided.

The solar array wing 371 according to this embodiment is capable of long-term operation in an orbit in the vicinity of LST 11:00 of sun-synchronous orbit and at an altitude of about 1000 km, for example. The solar array wing 371 is a solar array wing that rotates around the Y axis when flying with +X, which is orthogonal to the flying direction +Z, directed toward Earth. This enables effective power generation by the solar array wing 371. When the debris removal satellite 300 is flying with a specific direction in the debris removal satellite 300 always directed toward the sun, another possible arrangement may be to fix the solar array wing to be directed toward the sun.

FIG. 9 is a diagram illustrating an example of installation of the sun sensor 331 according to this embodiment.

The propulsion device 134 includes the thruster 341 having a jet port to emit a jet in the line-of-sight direction of the sun sensor 331. After capturing the debris, the debris removal satellite 300 lowers the orbital altitude while being directed toward the sun.

Figure 10:
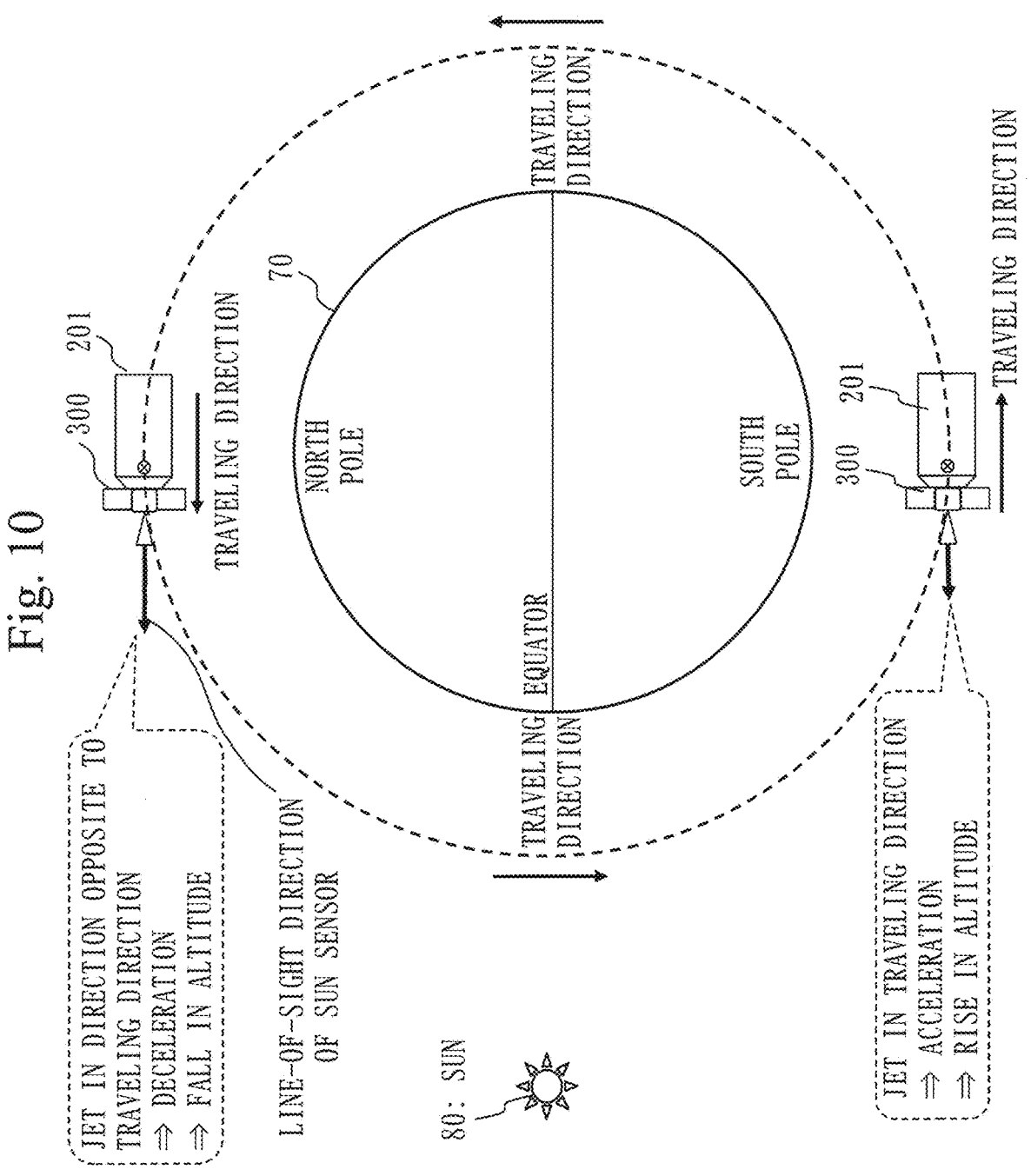
FIG. 10 is an example of a propulsion operation of the debris removal satellite after capturing debris according to Embodiment 1.

FIG. 10 is a diagram illustrating an example of a propulsion operation of the debris removal satellite 300 according to this embodiment after capturing the debris.

In the debris removal satellite 300, the position or orientation of a part on which the capture device 135 can operate may be limited. In this case, the debris removal satellite 300 in the debris-captured state will continue moving in a state coupled with the debris while facing a direction that depends on the motion state or attitude of the debris before being captured. Therefore, the debris removal satellite 300 in the debris-captured state may lose the attitude in inertial space. If the attitude is lost in outer space, the most effective measures for re-establishing the attitude is to detect the sun direction with the sun sensor 331 and to establish the attitude by being directed toward the sun.

For example, it is assumed that at LST 12:00 of sun-synchronous orbit, the sun sensor 331 is directed in the −Z direction and the main thruster jet direction for decelerating the debris removal satellite 300 in the debris-captured state is directed in the −Z direction.

In this case, the debris removal satellite 300 detects the sun direction with the sun sensor 331, controls the −Z direction to be directed toward the sun, and emits a thruster jet in the −Z direction when flying in the sun direction in the orbital plane in a polar orbit. As a result, the debris removal satellite 300 emits a jet in a direction opposite to the traveling direction, thereby decelerating and lowing the orbital altitude.

There may be a case in which there is a risk of intrusion into a congested orbit and it is necessary to maintain the altitude or raise the altitude again. In such a case, the debris removal satellite 300 emits a thruster jet in the −Z direction when flying in a direction opposite to the sun direction in the orbital plane. As a result, the debris removal satellite 300 emits a jet in the same direction as the traveling direction, thereby accelerating and raising the orbital altitude.

In order to remove debris before intruding into a congested orbit in the vicinity of LST 10:30 of sun-synchronous orbit and at an orbital altitude of about 500 km to 800 km, it is necessary to have the orbital inclination of the orbital plane concerned and remove the debris at a position at a higher orbital altitude. With this combination of the orbital inclination and the orbital altitude, the rotation of the orbital plane is slightly slower than that of the sun-synchronous orbit. Thus, the orbital plane slowly rotates from the vicinity of LST 12:00 toward LST 9:00.

In order to capture debris in advance at a higher altitude before the debris intrudes into an orbital plane of LST 11:00 in a congested orbit, the debris removal satellite 300 is operated, for example, as described below.

(1) The debris removal satellite is launched into an orbital altitude of about 1000 km on the LST 12:00 side of LST 11:00 and is operated while gradually lowering the orbital altitude.

(2) As a result of (1), the LST of the orbital plane gradually rotates from 11:00→10:00→9:00, so that the debris that is about to intrude into the congested orbital plane in the vicinity of 10:30 can be removed by the satellite built in advance for future use.

When the −Z axis is directed toward the sun in the orbital plane of LST 12:00, this results in a positional relationship such that the positive and reverse directions with respect to the traveling direction are generated in the orbital plane in the polar regions. However, as the LST moves away from 12:00, an out-of-plane vector will be generated between the sun direction and the traveling direction in the orbital plane.

The debris removal satellite 300 in the debris-captured state does not require strict orbit control, so that no major problem will occur even if it is operated with the out-of-plane vector component being ignored.

Figure 11:
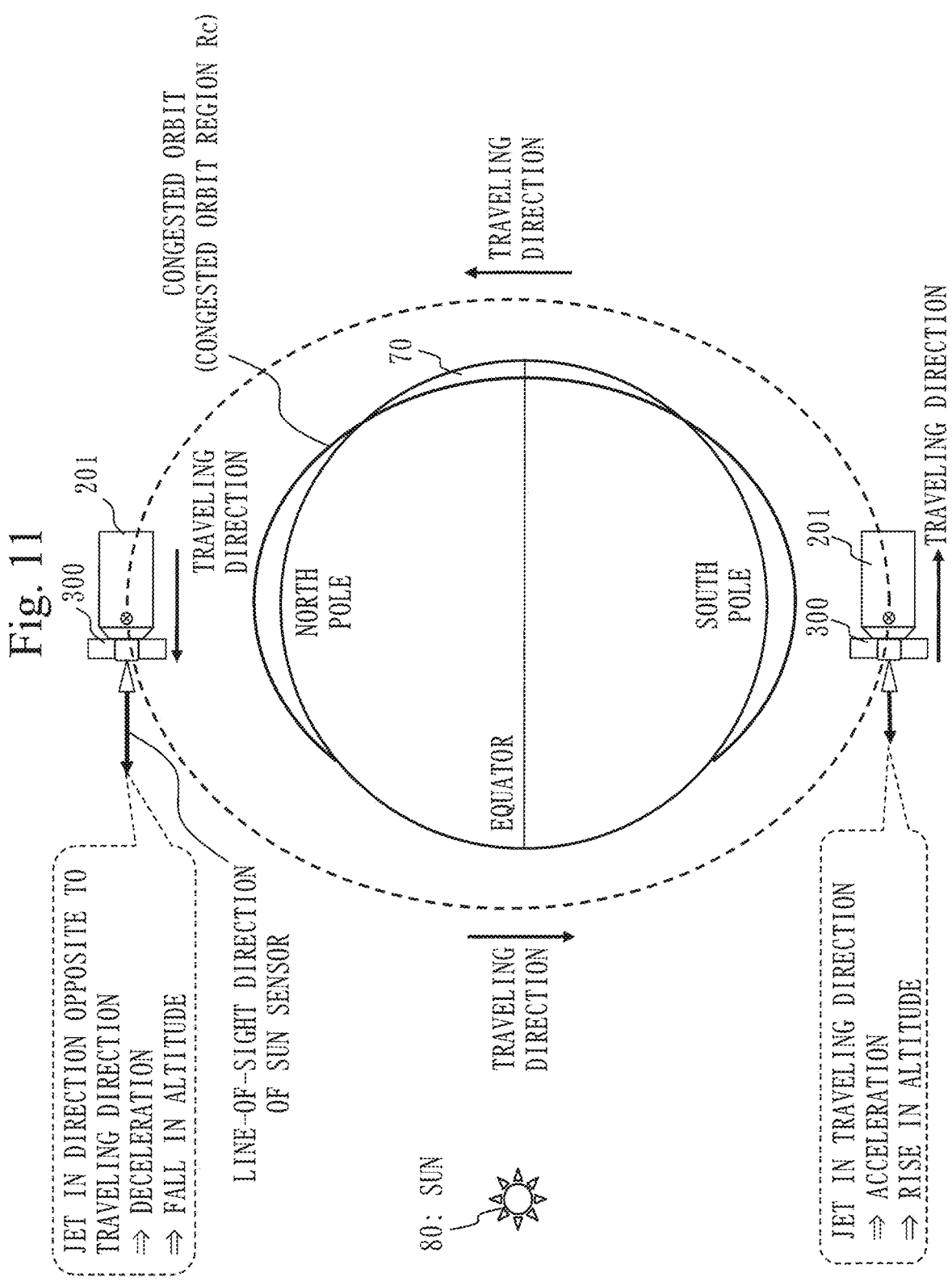
FIG. 11 is an example in which LST 11:00 or thereabout is assumed and the sun direction is slightly out of the plane in the debris removal satellite according to Embodiment 1.
Figure 12:
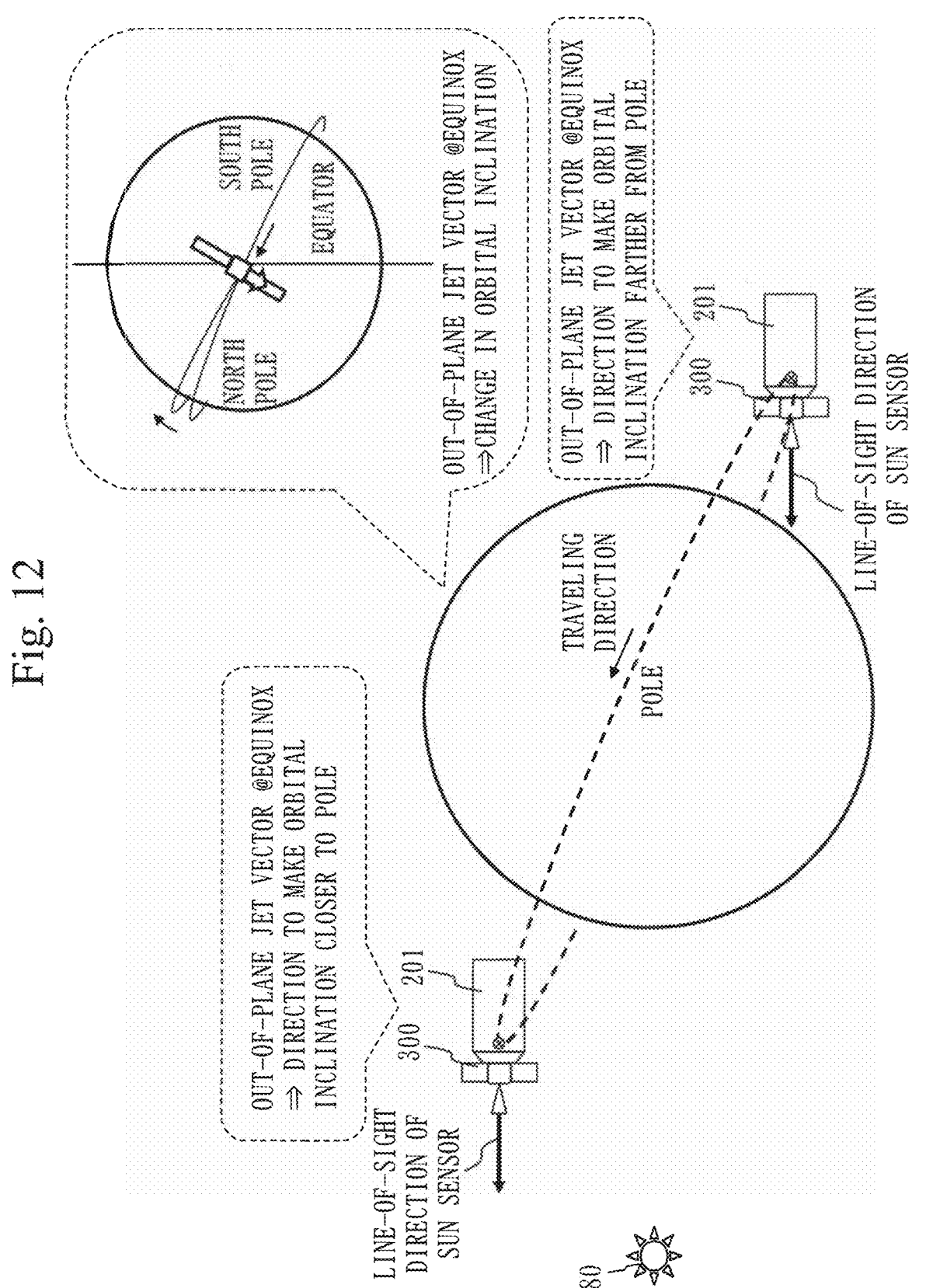
FIG. 12 is an example in which LST 11:00 or thereabout is assumed and the sun direction is slightly out of the plane in the debris removal satellite according to Embodiment 1.

FIGS. 11 and 12 are examples in which LST 11:00 or thereabout is assumed and the sun direction is slightly out of the plane in the debris removal satellite 300 according to this embodiment.

As illustrated in FIG. 12, when the thruster emits a jet in a direction orthogonal to the orbital plane at the ascending and descending nodes where the orbital plane passes the equator, this has the effect of changing the orbital inclination. Therefore, the effect of reducing the collision probability is also obtained by using the out-of-plane component to steer away from the orbital inclination of the congested orbital plane.

The reason for launching the debris removal satellite 300 built in advance for future use is to ensure responsiveness in an emergency. If it is predicted by orbital collision analysis that debris will intrude into the congested orbit region Rc, such as a congested orbital plane, there is a high risk that procuring a satellite from that moment will be too late. It typically takes more than one year to procure a satellite. Thus, in order to avoid a collision with the detected debris within one year from collision prediction, it is necessary to prepare a fast-response debris removal satellite system that launches a satellite built in advance for future use with a rocket built in advance for future use. It is realistic to prepare the debris removal satellite as a fast-response satellite in advance, and to launch the debris removal satellite after loading it with propellant and charging the power supply system immediately before the launch. As the launch rocket, a rocket using solid fuel is typically suitable for a fast-response system in which a completed product is built in advance for future use and is launched when necessary.

*Other Configurations*

<Variation 1>

Figure 13:
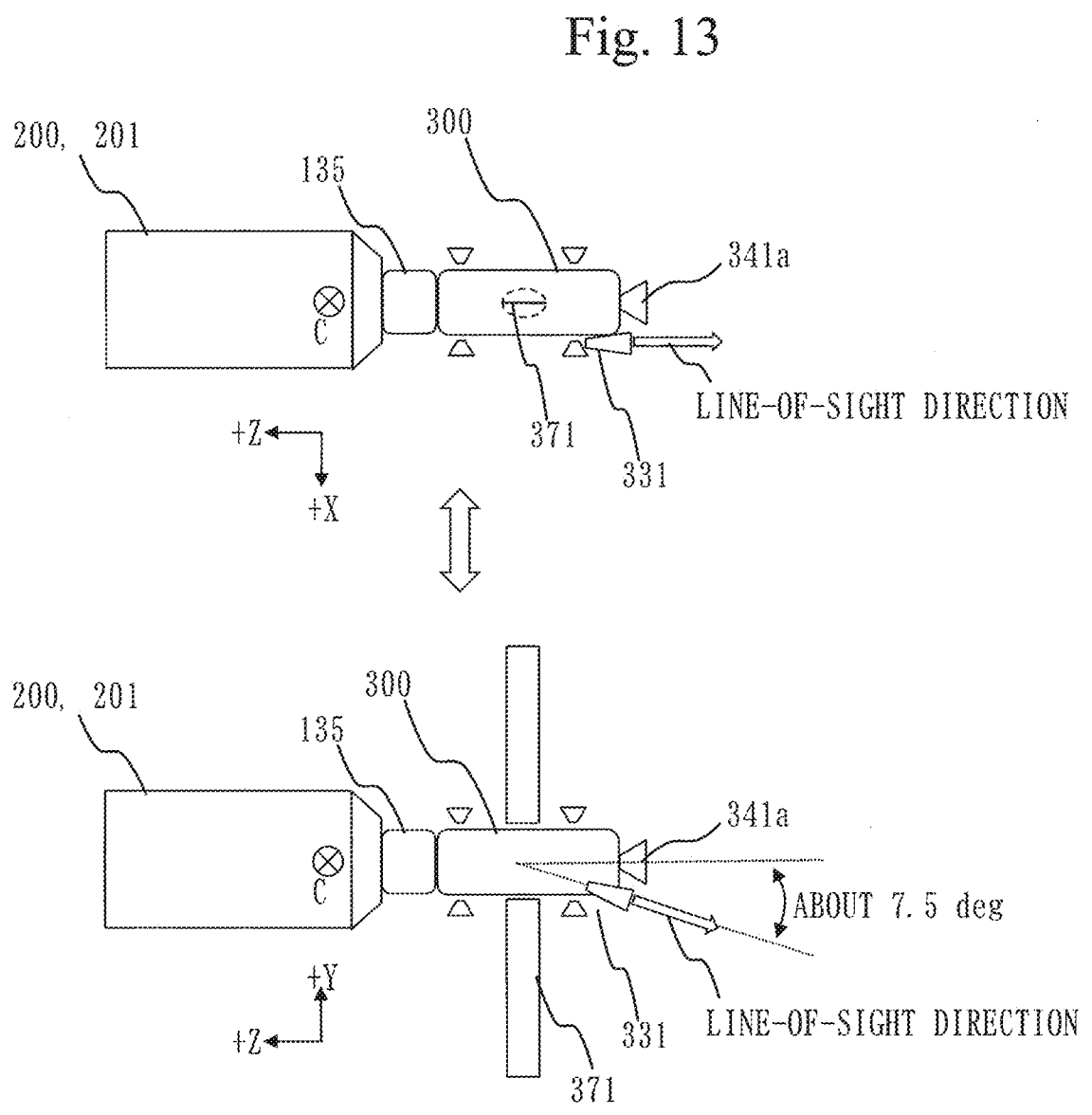

FIGS. 13 and 14 are diagrams illustrating examples of a propulsion operation of the debris removal satellite 300 after capturing the debris according to a variation of this embodiment.

In FIGS. 13 and 14, the capture device 135 is placed in a direction opposite to the jet direction of a thruster 341a with the maximum jet capacity among a plurality of thrusters. In FIGS. 13 and 14, the pointing direction of the sun sensor 331 is inclined by a predetermined angle with respect to the jet vector of the thruster 341a with the maximum jet capacity. For example, the pointing direction of the sun sensor 331 is shifted by about 7.5 degrees with respect to the jet vector of the thruster 341a with the maximum jet capacity.

As illustrated in FIG. 14, when the sun direction of LST 12:00 of sun-synchronous orbit as seen from the North pole is assumed to be 0 degrees, an orbital plane of LST 11:00 is located at a position rotated 7.5 degrees counterclockwise. Similarly, an orbital plane of LST 10:00 is located at a position rotated 15 degrees. Therefore, the pointing direction of the sun sensor 331 of the debris removal satellite 300 is inclined by −7.5 degrees around the X axis of the satellite coordinate system. In this way, when the attitude is such that the sun sensor 331 is directed to the sun in the orbit of LST 11:00, the thruster for deceleration in the debris removal satellite 300 emits a jet in a reverse orbit direction in the orbital plane in the polar region. Therefore, this has the effect of enhancing the efficiency of the propulsion system.

<Variation 2>

In this embodiment and Variation 1, aspects of using the sun sensor 331 have been described. However, the star sensor 332 may be used in place of the sun sensor 331. In terms of functionality, the star sensor 332 can be used as an alternative. In a situation where the debris removal satellite 300 after capturing debris is rotating at high speed, it is easier for the sun sensor 331 to supplement the target. However, the performance of the star sensor 332 has also improved, and by matching a star map and acquired data to measure the attitude in inertial space, a similar operation as when using the sun sensor 331 is possible. Note that a plurality of star sensors 332 are to be mounted and they may be arranged in any manner on the satellite. Therefore, the flying direction of the debris removal satellite 300 after capturing debris and the relationship between the jet vector of the thruster with the maximum jet capacity and the star sensors need to be determined in advance in the design stage.

<Variation 3>

In this embodiment, the functions of the control unit 110 are realized by software. As a variation, the functions of the control unit 110 may be realized by hardware.

Figure 15:
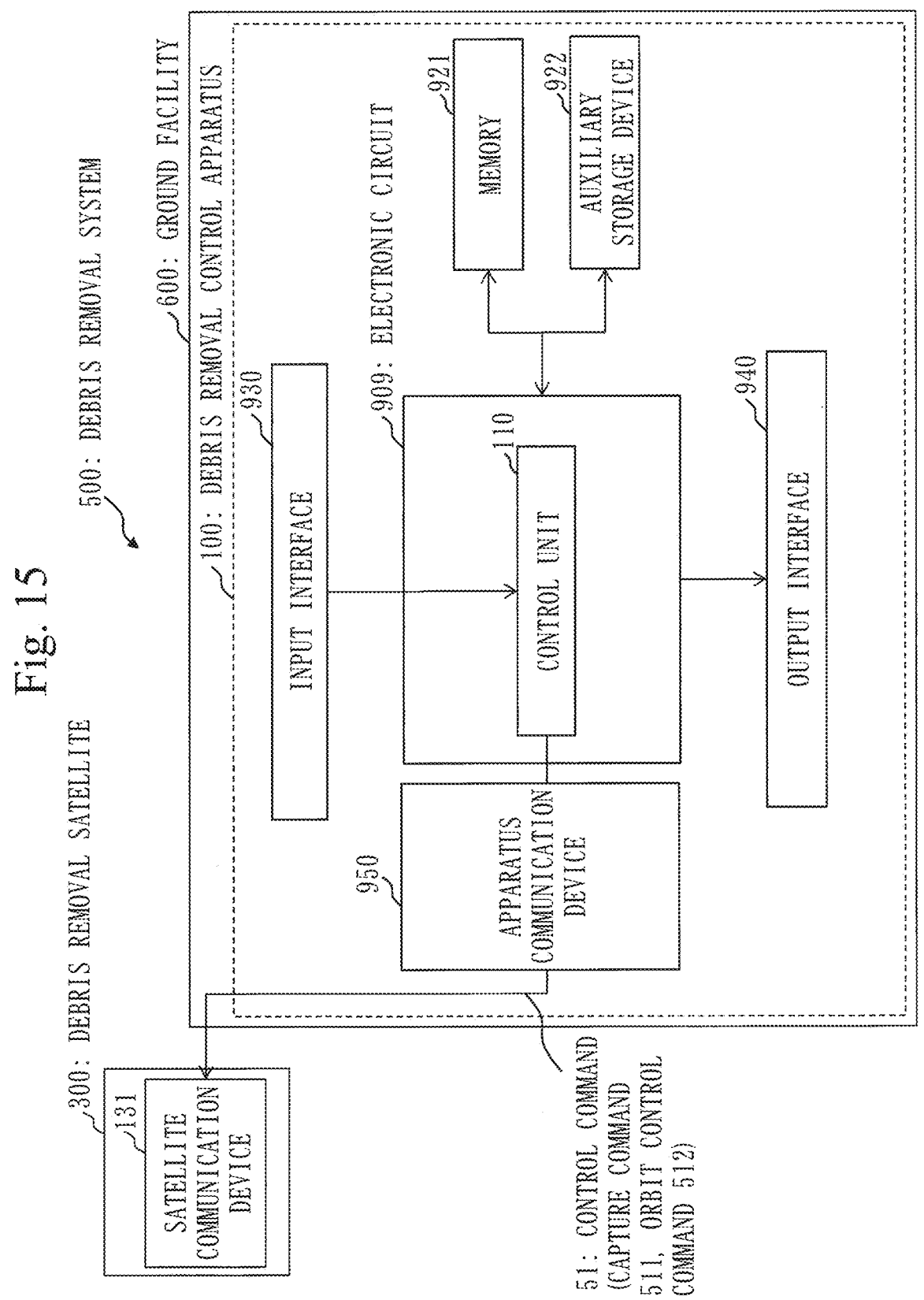
FIG. 15 is a configuration diagram of a debris removal system according to a variation of Embodiment 1.

FIG. 15 is a diagram illustrating a configuration of the debris removal system 500 according to a variation of this embodiment.

The debris removal control apparatus 100 includes an electronic circuit 909 in place of the processor 910.

The electronic circuit 909 is a dedicated electronic circuit that realizes the functions of the control unit 110.

Specifically, the electronic circuit 909 is a single circuit, a composite circuit, a programmed processor, a parallel-programmed processor, a logic IC, a GA, an ASIC, or an FPGA. GA is an abbreviation for Gate Array.

The functions of the control unit 110 may be realized by one electronic circuit, or may be distributed among and realized by a plurality of electronic circuits.

As another variation, some of the functions of the control unit 110 may be realized by the electronic circuit, and the rest of the functions may be realized by software.

Each of the processor and the electronic circuit is also called processing circuitry. That is, in the debris removal control apparatus 100, the functions of the control unit 110 are realized by the processing circuitry.

Embodiment 2

In this embodiment, differences from Embodiment 1 will be mainly described. Components that are substantially the same as those in Embodiment 1 are denoted by the same reference signs, and description thereof will be omitted.

Figure 16:
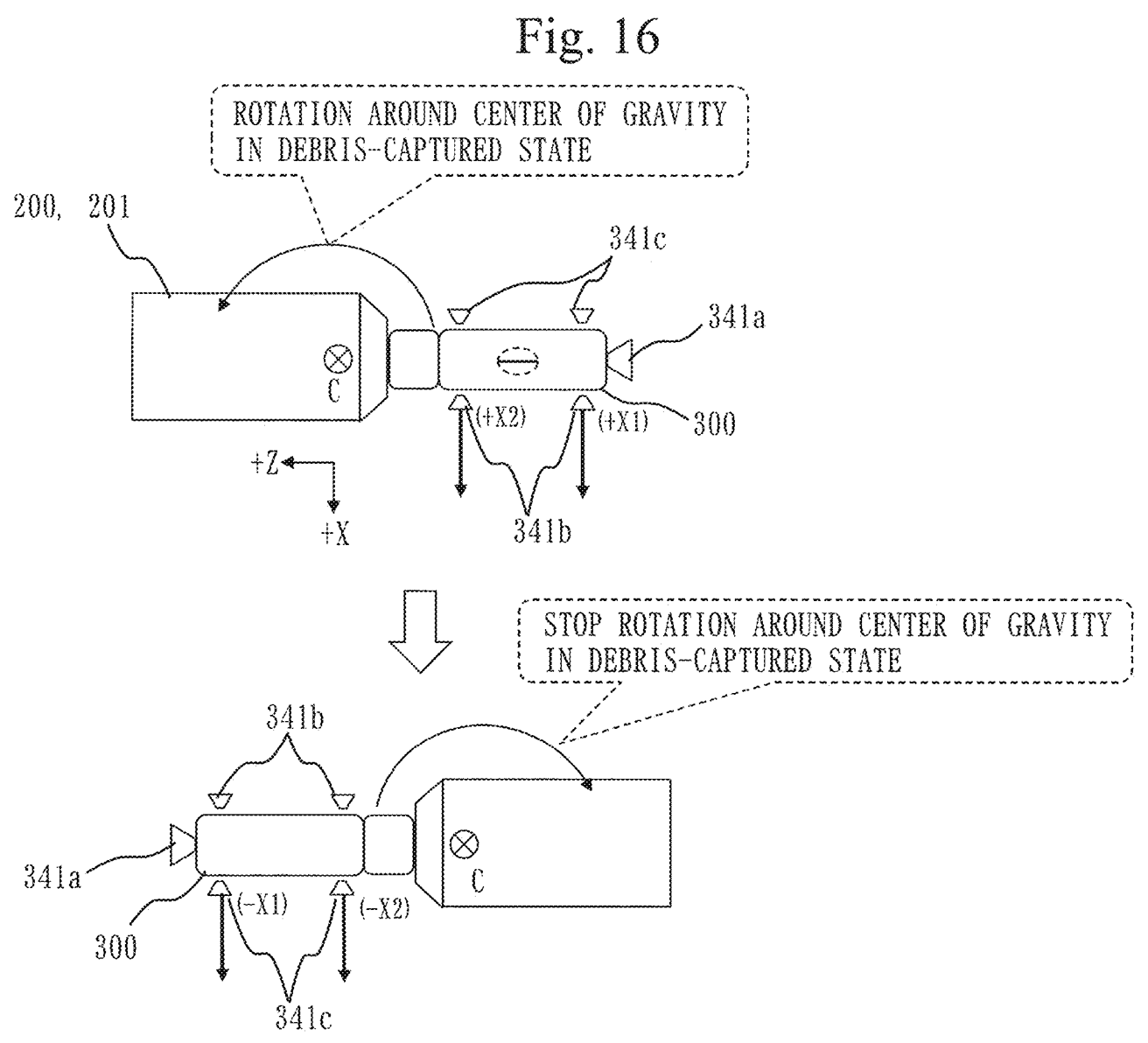

FIG. 16 is a diagram illustrating an example of a procedure for reversing with respect to the +Z direction, which is the traveling direction, in the debris removal satellite 300 in the debris-captured state according to this embodiment.

In this embodiment, the capture device 135 of the debris removal satellite 300 is placed in the opposite direction to a jet port of the thruster 341a with the maximum jet capacity among a plurality of thrusters. The capture device 135 is also provided with thrusters 341b and 341c having jet ports in the positive direction and the negative direction, respectively, of an axis orthogonal to the jet direction of the thruster 341a with the maximum jet capacity.

By jets of the thrusters 341b and 341c placed in the orthogonal direction, torque is given around the center of gravity of the debris removal satellite 300 in the debris-captured state. It is assumed that the jet vector of the thruster 341a with the maximum jet capacity passes through the center of gravity of the debris removal satellite 300 in the debris-captured state and is in a direction opposite to the flying direction.

The debris removal satellite 300 uses the thruster 341a with the maximum jet capacity to cause the debris removal satellite 300 in the debris-captured state to decelerate and enter the atmosphere. For this entry into the atmosphere, it is necessary to make the debris removal satellite 300 fly in the attitude such that the jet vector of the thruster 341a passes through the center of gravity C of the debris removal satellite 300 in the debris-captured state and the jet vector is directed in a direction opposite to the flying direction.

However, the attitude and motion state of the debris removal satellite 300 after capturing the debris are determined depending on the initial attitude and motion state of the debris and a position where the capture device can access. For this reason, it is necessary to change the attitude of the debris removal satellite 300 in the debris-captured state until the desired attitude is achieved. Depending on the center of gravity if the captured debris is large, it may be difficult to change the attitude by an attitude control method by the debris removal satellite alone.

In this embodiment, the attitude of the debris removal satellite 300 in the debris-captured state is changed by utilizing translational force of the thrusters away from the center of gravity as torque around the center of gravity.

In FIG. 16, the capture device 135 and the thruster 341a with the maximum jet capacity are placed on opposite sides on the Z axis. Rotation torque around the center of gravity is given to the debris removal satellite 300 in the debris-captured state by the thruster 341b in the +X direction orthogonal to the Z axis. Then, rotation torque in the opposite direction is given to the debris removal satellite 300 in the debris-captured state by the thruster 341c in the −X direction so as to bring the debris removal satellite 300 to a halt at the desired location. The rotation torque in the opposite direction acts as a brake and the debris removal satellite 300 in the debris-captured state comes to a halt.

Then, by a jet in the −Z direction against the +Z direction, which is the flying direction, of the thruster 341a with the maximum jet capacity, the debris removal satellite 300 in the debris-captured state decelerates, thereby lowering the orbital altitude.

Note that the "thruster with the maximum jet capacity" is used as a general term for deceleration means for lowering the orbital altitude, and it may be composed of a plurality of thrusters. When it is realized by a plurality of thrusters, it is arranged that a composite vector of the plurality of thrusters when jets are emitted simultaneously at the respective positions passes through the center of gravity of the debris removal satellite 300 in the debris-captured state and is in a direction opposite to the flying direction. In this case, the arrangement and the balance of jet amounts are adjusted so that rotation torque around the center of gravity is not generated due to the multiple vectors.

FIG. 17 is a diagram illustrating an example of a procedure for restraining a rotation movement in the debris removal satellite 300 in the debris-captured state according to this embodiment.

If the debris is making an unexpected rotation movement, it is necessary to restrain rotation to stop the rotation movement. The position of the center of gravity of the debris removal satellite 300 after capturing large debris is shifted from the position of the center of the gravity of the debris removal satellite alone. For this reason, unnecessary torque may be generated around a rotation axis different from the rotation axis to be restrained.

Figure 18:
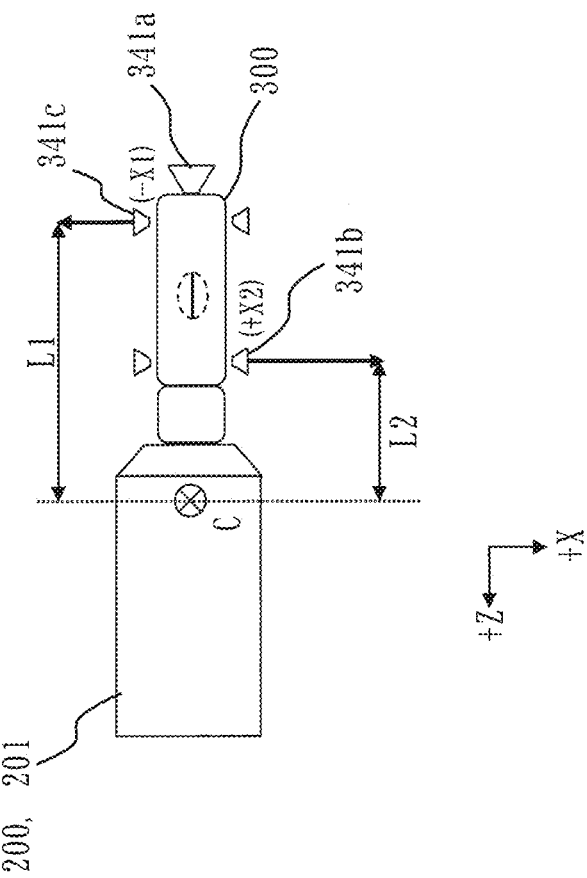
FIG. 18 is an example of a procedure for preventing unnecessary rotation from being generated in the debris removal satellite according to Embodiment 2.

FIG. 18 is a diagram illustrating an example of a procedure for preventing unnecessary rotation in the debris removal satellite 300 according to this embodiment.

In FIG. 18, the thrusters are placed at positions at respectively different distances from the center of gravity in the debris-captured state. The debris removal satellite 300 operates the thrusters with a thrust balance that is inversely proportional to the distances when torque is generated around the jet vector of the thruster 341a with the maximum jet capacity. By this, the debris removal satellite 300 prevents torque from being generated around the axis orthogonal to the jet vector of the thruster 341a with the maximum jet capacity.

The center-of-gravity position of the debris removal satellite 300 after capturing large debris is shifted from the center-of-gravity position of the debris removal satellite alone. For this reason, unnecessary torque may be generated around a rotation axis different from the rotation axis to be restrained. As illustrated in FIG. 18, by operating the thrust of the thrusters located at different distances from the center of gravity in a balance that is inversely proportional to the distances, rotation restraining torque is generated around the rotation axis that needs to be restrained, whereas unnecessary torque is prevented from being generated around another different rotation axis.

Specifically, the distance between the thruster 341c with a jet vector x1 and the center of gravity is denoted as L1, and the distance between the thruster 341b with a jet vector x2 and the center of gravity is denoted as L2. In this case, the jet vectors of the thrusters 341c and 341b are adjusted so that $x1 \times L1 - x2 \times L2 = 0$. As a result, it is possible to generate rotation restraining torque around the desired rotation axis and to prevent unnecessary torque from being generated around another different rotation axis.

In the debris removal satellite 300 according to this embodiment, the thruster 341a with the maximum jet capacity can change the jet vector. In order to rationally lower the orbital altitude, the jet vector of the thruster 341a with the maximum jet capacity should be set to pass through the center of gravity of the debris removal satellite 300 after capturing the debris and to be in a direction opposite to the flying direction. However, if the state of the debris is not determined in advance, the center-of-gravity position may be different from the predicted position. In this case, if the jet vector of the thruster can be adjusted to pass through the center of gravity of the debris removal satellite 300 after capturing the debris, this has the effect of facilitating the achievement of the desired state.

Description of Effects of Embodiments 1 and 2

A typical method for deorbiting a low Earth orbit satellite is to operate a propulsor in a direction opposite to the satellite traveling direction so as to lower the orbital altitude and let the satellite burn out by entering the atmosphere. However, the orbital altitudes of mega-constellations recently being planned are 1000 km or higher, which are higher than the altitudes of low Earth orbit satellites. Therefore, in deorbit at the end of life or due to a failure, there is a risk of colliding with a satellite flying at a lower orbital altitude.

In a mega-constellation, orbital planes are arranged in various ways and many satellites are flying in formation in each of the orbital planes. Therefore, there are various orbital routes through which deorbiting satellites may pass. In particular, if there is a probability that a satellite may pass through an orbit region congested with low Earth satellites, such as the vicinity of LST 10:30 of sun-synchronous orbit and the polar regions, the collision probability is high.

When deorbit depends on free fall, the orbital plane rotates as the altitude becomes gradually lower, so that a satellite deorbiting from any orbital plane may pass through an orbit congested with sun-synchronous satellites.

In deorbit of a satellite in a satellite constellation arranged with orbital planes with an orbital inclination of approximately 90 degrees that pass through the vicinity of the polar regions, even when the orbital altitude decreases, the orbital inclination remains almost the same, so that there is a high probability of collision with a polar orbit satellite in a lower orbit.

It would be too late if countermeasures are prepared after a congested orbit intrusion alarm is issued.

In the embodiments described above, a collision can be avoided as described below.

In order to avoid passage through a congested orbital plane, the rotation of the orbital plane is used to accelerate the fall before passing through the congested orbit. Alternatively, a collision is avoided by timing the fall to occur through a non-congested orbital plane after the congested orbital plane has passed away.

As means for changing the timing of passing through the congested orbital plane, accelerating the deorbiting satellite raises the orbital altitude, so that the fall timing can be delayed. Decelerating the deorbiting satellite causes the orbital altitude to be lowered faster, so that the fall timing can be made earlier. Since the orbital plane rotates by perturbation depending on the time to remain at the orbital altitude concerned, it is also possible to wait for the congested orbit to pass away.

The orbital inclination can be changed by operating a propulsion device in a direction orthogonal to the traveling direction when the deorbiting satellite passes the ascending or descending node, so that it is also possible to accelerate the rotation of the orbital plane. A collision is avoided by intentionally changing the orbital inclination so as to change the orbital plane to avoid passing through the polar regions at altitudes that are congested in the polar regions.

In the embodiments described above, by launching a fast-response satellite built in advance for future use with a rocket built in advance for future use, responsiveness is ensured to allow dealing with an emergency. In the embodiments described above, by making orbital launch in the vicinity of LST 11:00 of sun-synchronous orbit a design precondition, as the congested orbit region that will require urgent handling by a debris removal satellite, completed products can be built in advance for future use. Since a sun-synchronous satellite is one type of polar orbit satellite, a debris removal satellite prepared under this design precondition can be used also for the purpose of removing debris in the polar and high-latitude regions.

Examples of orbital parameters for achieving sun-synchronous orbits are the following combinations.

orbital altitude 500 km, orbital inclination 97.4 degrees
orbital altitude 800 km, orbital inclination 98.6 degrees
orbital altitude 1000 km, orbital inclination 99.5 degrees The sun-synchronousness of a circular orbit is uniquely determined by the correlation between the orbital altitude and the orbital inclination.

If Earth is a perfect sphere, the normal direction of an orbital plane is fixed in inertial space. In reality, however, the oblate shape of Earth produces the effect of rotating the normal of the orbital plane in the latitude direction, and a sun-synchronous orbit is achieved under the condition that the normal completes one rotation in one year.

For example, if the debris removal satellite is launched into an orbital plane with an orbital altitude of 1000 km and an orbital inclination of 98.6 degrees, this will contribute to increasing the rotation speed of the orbital plane. Therefore, by launching the debris removal satellite into an orbital plane of LST 11:00 at an altitude of about 1000 km, which is higher than congested orbital altitudes of 500 to 800 km, it is possible to capture debris that is going to intrude into a congested orbit located in the vicinity of LST 10:30. This is because if the debris is flying qualitatively at a lower altitude than that of the satellite itself in an orbital plane of earlier LST, the debris removal satellite can meet the debris by waiting for appropriate time.

However, the rotation speed of the normal caused by a sight difference in the orbital inclination is extremely slow. Thus, if the orbital conditions of debris intrusion can be predicted with high accuracy, it is desirable to launch the debris removal satellite, when launched by a rocket, into orbit at the optimum location for capturing the debris.

The debris removal satellite that is designed under the preconditions of at least LST 11:00 and an orbital altitude of 1000 km can deal with the removal of debris in the vicinity of LST 10:30 and at orbital altitudes of 500 km to 800 km without any problem. It is also possible to deal with debris removal operation in the polar and high-altitude regions.

As described above, the debris removal system according to the above embodiments has the effect of preventing debris from intruding into the congested orbit region Rc and protecting the space environment.

Embodiment 3

In this embodiment, differences from Embodiments 1 and 2 will be mainly described. Components that are substantially the same as those in Embodiments 1 and 2 will be denoted by the same reference signs, and description thereof will be omitted.

Figure 19:
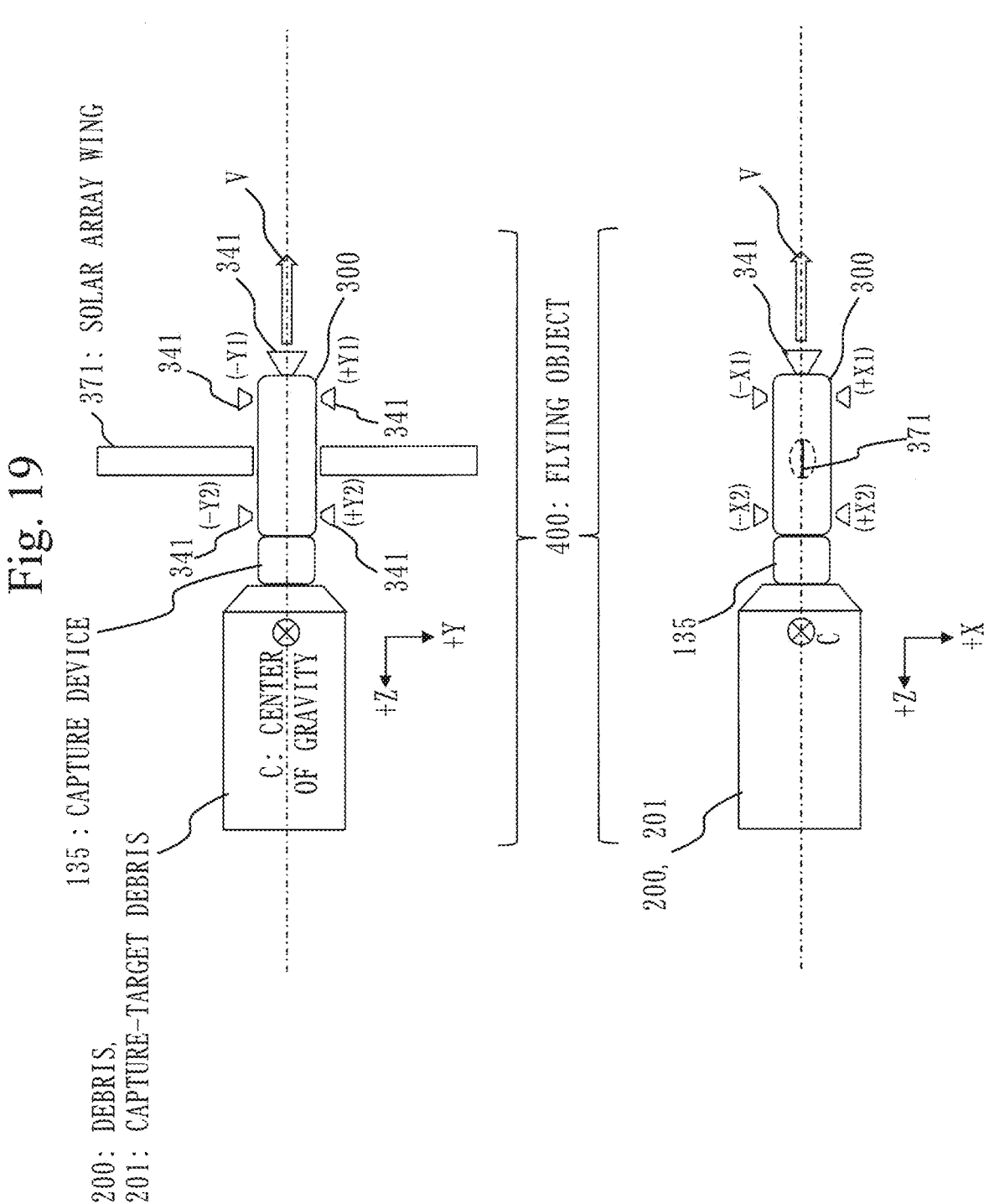
FIG. 19 is a schematic diagram of two sides of the debris removal satellite according to Embodiment 3 that has captured capture-target debris.

FIG. 19 is a schematic diagram of two sides of the debris removal satellite 300 according to this embodiment that has captured the capture-target debris 201.

In FIG. 19, a flying object 400 is the debris removal satellite 300 coupled with the debris 200 that has been captured. In this embodiment, a center-of-gravity position C of the flying object 400 is on the straight line of a traveling direction vector V of the propulsion device 134.

The traveling direction vector V of the propulsion device 134 is referred to also as a propulsion vector of the propulsion device 134. The traveling direction vector V of the propulsion device 134 may be, for example, the jet vector of the thruster 341 with the maximum jet capacity.

In the debris removal control apparatus 100, the control unit 110 transmits, to the debris removal satellite 300, a control command 51 to control the propulsion device 134 so that the center-of gravity position C of the flying object 400 is on the straight line of the traveling direction vector V of the propulsion device 134.

More specifically, the propulsion device 134 includes the plurality of thrusters 341.

The control unit 110 transmits the control command 51 to control the plurality of thrusters 341 so that the center-of gravity position C of the flying object 400 is on the straight line of the traveling direction vector V of the propulsion device 134.

In reality, the center of gravity after capturing a non-cooperative target is not always conveniently aligned with the propulsion vector of a fixed thruster. For this reason, it is realistic that the debris removal control apparatus 100 controls the plurality of thrusters 341 to control the propulsion vector toward the center of gravity.

It is expected that after the debris removal satellite 300 captures debris, the distance to the center-of-gravity position of the flying object increases, so that it is difficult to control the propulsion device. The debris removal satellite 300 and the debris removal control apparatus 100 according to this embodiment have the effect of being able to facilitate control of the propulsion device even if the distance to the center-of-gravity position of the flying object, which is the debris removal satellite coupled with the captured debris, increases.

In Embodiments 1 to 3 above, each unit of the debris removal control apparatus has been described as an independent functional block. However, the configuration of the debris removal control apparatus may be different from the configuration in the embodiments described above, and the functional block of the debris removal control apparatus may be configured in any arrangement, provided that the functions described in the above embodiments can be realized. The debris removal control apparatus may be one apparatus or may be a system composed of a plurality of apparatuses.

Portions of Embodiments 1 to 3 may be implemented in combination. Alternatively, one portion of these embodiments may be implemented. These embodiments may be implemented as a whole or partially in any combinations.

That is, in Embodiments 1 to 3, each of the embodiments may be freely combined, or any constituent element of each of the embodiments may be modified, or any constituent element may be omitted in each of the embodiments.

The above embodiments are essentially preferable examples, and are not intended to limit the scope of the present disclosure, the scope of applications of the present disclosure, and the scope of uses of the present disclosure. Various modifications can be made to the above embodiments as necessary.

REFERENCE SIGNS LIST

20: satellite constellation; 21: orbital plane; 30: satellite; 70: Earth; 80: Sun; 100: debris removal control apparatus; 110: control unit; 131: satellite communication device; 132: command data processing device; 133: attitude and orbit control device; 134: propulsion device; 135: capture device; 136: mission data processing device; 137; power supply device; 200: debris; 201: capture-target debris; 331: sun sensor; 332: star sensor; 341, 341*a*, 341*b*, 341*c*: thruster, 342: propellant tank; 371: solar array wing; 300: debris removal satellite; 301: satellite group; 400: flying object; 500: debris removal system; 511: capture command; 512: orbit control command; 600: ground facility; 909: electronic circuit; 910: processor, 921: memory; 922: auxiliary storage device; 930: input interface; 940: output interface; 950: apparatus communication device; C: center of gravity; Rc: congested orbit region.

The invention claimed is:

1. A debris removal satellite comprising:
a capture device to capture debris in outer space by restraining six degrees of freedom;
a solar array wing that is operable at an orbit higher than a congested orbit region; and
a propulsion device including a plurality of thrusters,
the debris removal satellite capturing debris, and before intrusion into the congested orbit region, which is a congested orbit or a congested region including an orbital plane of a mega-constellation, preventing the debris from intruding into the congested orbit region by a method of changing an orbital altitude by operating the propulsion device to change time of intrusion into the congested orbit region, or a method of gradually changing an orbital inclination,
wherein the capture device is placed in a direction opposite to a jet port of a thruster with a maximum jet capacity among the plurality of thrusters,
wherein the propulsion device includes thrusters having jet ports in a positive direction and a negative direction of an axis orthogonal to a jet direction of the thruster with the maximum jet capacity, torque is given around a center of gravity of the debris removal satellite in a debris-captured state by jets of the thrusters placed in an orthogonal direction, and a jet vector of the thruster with the maximum jet capacity passes through the center of gravity and is in a direction opposite to a flying direction, and
wherein when an attitude of the debris removal satellite needs to be changed, translational force of thrusters away from the center of gravity is utilized as torque around the center of gravity, so as to change the attitude in a debris-captured state.

2. The debris removal satellite according to claim 1, wherein the jet vector of the thruster with the maximum jet capacity can be changed.

3. The debris removal satellite according to claim 1, wherein a center-of-gravity position of the debris removal satellite coupled with the captured debris is located at a position away from the debris removal satellite and within the captured debris.

4. A ground facility to control operation of the debris removal satellite according to claim 1.

5. The debris removal satellite according to claim 1, wherein a center-of-gravity position of a flying object that is the debris removal satellite coupled with the debris after the debris has been captured is on a straight line of a traveling direction vector formed by the plurality of thrusters included in the propulsion device, or in the jet direction of the thruster with the maximum jet capacity.

6. A ground facility to control operation of the debris removal satellite according to claim 5.

7. A debris removal control apparatus to be provided in the debris removal satellite according to claim 1, the debris removal control apparatus comprising:
a communication device to communicate with the debris removal satellite; and
a processor to generate a control command to control the propulsion device included in the debris removal satellite,
wherein the processor transmits the control command to control the propulsion device so that a center-of-gravity position of a flying object, which is the debris removal satellite coupled with debris after the debris has been captured, is on a straight line of a traveling direction vector of the propulsion device.

8. A debris removal control apparatus comprising:
a communication device to communicate with the debris removal satellite according to claim 1; and
a processor to generate a control command to control the plurality of thrusters included in the debris removal satellite,
wherein the processer transmits the control command to control the plurality of thrusters so that a center-of-gravity position of a flying object, which is the debris removal satellite coupled with debris after the debris has been captured, is on a straight line of a traveling direction vector of the propulsion device.

9. A debris removal control method that is performed by a debris removal control apparatus including
a communication device to communicate with the debris removal satellite according to claim 1; and
a processor to generate a control command to control the propulsion device included in the debris removal satellite,
the debris removal control method comprising
transmitting the control command to control the propulsion device so that a center-of-gravity position of a flying object, which is the debris removal satellite coupled with debris after the debris has been captured, is on a straight line of a traveling direction vector of the propulsion device.

10. A debris removal control method that is performed by a debris removal control apparatus including
a communication device to communicate with the debris removal satellite according to claim 1; and a processor to generate a control command to control the plurality of thrusters provided in the debris removal satellite, the debris removal control method comprising transmitting the control command to control the plurality 5 of thrusters so that a center-of-gravity position of a flying object, which is the debris removal satellite coupled with debris after the debris has been captured, is on a straight line of a traveling direction vector of the propulsion device. 10

11. A debris removal satellite comprising:

a capture device to capture debris in outer space by restraining six degrees of freedom;

a solar array wing that is operable at an orbit higher than a congested orbit region; and 15 a propulsion device including a plurality of thrusters, the debris removal satellite capturing debris, and before intrusion into the congested orbit region, which is a congested orbit or a congested region including an orbital plane of a mega-constellation, preventing the debris from intruding into the congested orbit region by a method of changing an orbital altitude by operating the propulsion device to change time of intrusion into the congested orbit region, or a method of gradually changing an orbital inclination, wherein the plurality of thrusters are placed at a plurality of positions at respectively different distances from a center of gravity of the debris removal satellite in a debris-captured state, and wherein when torque is generated around a jet vector of a thruster with a maximum jet capacity among the plurality of thrusters, the debris removal satellite operates the other thrusters with a thrust balance that is inversely proportional to the distances, so as to prevent unnecessary torque from being generated around an axis that is orthogonal to the jet vector, and prevent unnecessary torque from being generated for a different rotation axis.

\* \* \* \* \*